US010173236B2

(12) United States Patent
Preheim et al.

(10) Patent No.: US 10,173,236 B2
(45) Date of Patent: Jan. 8, 2019

(54) NOZZLE CONTROL SYSTEM AND METHOD

(71) Applicant: Raven Industries, Inc., Sioux Falls, SD (US)

(72) Inventors: John D. Preheim, Beresford, SD (US); Brent A. Driesen, Alvord, IA (US); Nicholas O. Michael, Sioux Falls, SD (US); Jared Ernest Kocer, Sioux Falls, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 15/629,696

(22) Filed: Jun. 21, 2017

(65) Prior Publication Data
US 2017/0348718 A1 Dec. 7, 2017

Related U.S. Application Data

(63) Continuation-in-part of application No. 15/029,935, filed as application No. PCT/US2014/061150 on Oct. 17, 2014, now Pat. No. 9,781,916.
(Continued)

(51) Int. Cl.
*B05B 12/00* (2018.01)
*B05B 1/20* (2006.01)
(Continued)

(52) U.S. Cl.
CPC .......... *B05B 12/008* (2013.01); *A01C 23/007* (2013.01); *A01C 23/047* (2013.01);
(Continued)

(58) Field of Classification Search
CPC ... B05B 12/008; B05B 12/006; B05B 12/004; B05B 12/00; B05B 1/20; B05B 1/14;
(Continued)

(56) References Cited

U.S. PATENT DOCUMENTS 1,582,986 A 5/1926 Frank
3,197,299 A 7/1965 Bosse et al.
(Continued)

FOREIGN PATENT DOCUMENTS

AU 2006202376 B2 12/2006
AU 2009203181 A1 2/2010
(Continued)

OTHER PUBLICATIONS

"U.S. Appl. No. 15/703,818, Preliminary Amendment filed Nov. 3, 2017", 6 pgs.
(Continued)

*Primary Examiner* — Christopher J. Novosad
(74) *Attorney, Agent, or Firm* — Schwegman Lundberg & Woessner, P.A.

(57) ABSTRACT

A system for controlling nozzle flow rate includes a master node having an expected overall flow rate module configured to generate an expected overall flow rate of an agricultural product based on one or more sprayer characteristics, and an adjustment module configured to generate an error correction based on a difference between the expected overall flow rate and an actual overall flow rate of the agricultural product. A plurality of smart nozzles are in communication with the master node, each of the smart nozzles includes an electronic control unit in communication with one or more control valves and one or more nozzle assemblies. Each of the smart nozzles includes a target smart nozzle flow rate module configured to generate a target smart nozzle flow rate of the agricultural product based on the one or more sprayer characteristics. The target smart nozzle flow rate is adjusted according to the error correction.

33 Claims, 15 Drawing Sheets

Related U.S. Application Data

(60) Provisional application No. 62/352,778, filed on Jun. 21, 2016, provisional application No. 61/892,339, filed on Oct. 17, 2013.

(51) Int. Cl.

| | | |
|---|---|---|
| *A01C 23/00* | (2006.01) | |
| *A01C 23/04* | (2006.01) | |
| *A01M 7/00* | (2006.01) | |
| *B05B 7/32* | (2006.01) | |
| *B05B 9/06* | (2006.01) | |
| *B05B 12/08* | (2006.01) | |
| *B05B 15/50* | (2018.01) | |

(52) U.S. Cl.
CPC ............ *A01M 7/0089* (2013.01); *B05B 7/32* (2013.01); *B05B 9/06* (2013.01); *B05B 12/085* (2013.01); *B05B 15/50* (2018.02); *A01C 23/008* (2013.01); *B05B 1/20* (2013.01)

(58) Field of Classification Search
CPC ......... B05B 1/00; A01C 23/007; A01C 23/00; A01C 23/047; A01C 23/04; A01C 23/008; A01M 7/0089
See application file for complete search history.

(56) References Cited

U.S. PATENT DOCUMENTS

| | | |
|---|---|---|
| 3,955,795 A | 5/1976 | Neely |
| 4,530,463 A | 7/1985 | Hiniker et al. |
| 4,582,085 A | 4/1986 | Hafner et al. |
| 4,632,358 A | 12/1986 | Orth et al. |
| 4,803,626 A | 2/1989 | Bachman et al. |
| 5,285,814 A | 2/1994 | Pettersson et al. |
| 5,337,959 A | 8/1994 | Boyd |
| 5,475,614 A | 12/1995 | Tofte et al. |
| 5,479,812 A | 1/1996 | Juntunen et al. |
| 5,496,100 A | 3/1996 | Schmid |
| 5,503,366 A | 4/1996 | Zabeck et al. |
| 5,649,687 A | 7/1997 | Rosas et al. |
| 5,653,389 A | 8/1997 | Henderson et al. |
| 5,703,554 A | 12/1997 | Polgar et al. |
| 5,704,546 A | 1/1998 | Henderson et al. |
| 5,772,114 A | 6/1998 | Hunter |
| 5,884,224 A | 3/1999 | McNabb et al. |
| 5,913,915 A | 6/1999 | McQuinn |
| 5,919,242 A | 7/1999 | Greatline et al. |
| 5,941,303 A | 8/1999 | Gowan et al. |
| 5,967,066 A | 10/1999 | Giles et al. |
| 5,971,294 A | 10/1999 | Thompson et al. |
| 5,978,723 A | 11/1999 | Hale et al. |
| 6,070,538 A | 6/2000 | Flamme et al. |
| 6,070,539 A | 6/2000 | Flamme et al. |
| 6,079,340 A | 6/2000 | Flamme et al. |
| 6,086,042 A | 7/2000 | Scott et al. |
| 6,112,999 A | 9/2000 | Fingleton et al. |
| 6,122,581 A | 9/2000 | McQuinn |
| 6,149,071 A | 11/2000 | Maccallummhor et al. |
| 6,189,466 B1 | 2/2001 | Sinclair et al. |
| 6,189,807 B1 | 2/2001 | Miller et al. |
| 6,199,000 B1 | 3/2001 | Keller et al. |
| 6,209,563 B1 | 4/2001 | Seid et al. |
| 6,216,614 B1 | 4/2001 | Wollenhaupt |
| 6,230,091 B1 | 5/2001 | McQuinn et al. |
| 6,236,924 B1 | 5/2001 | Motz et al. |
| 6,269,757 B1 | 8/2001 | Kiest |
| 6,305,583 B1 | 10/2001 | Ward et al. |
| 6,486,761 B1 | 11/2002 | Czarnetzki et al. |
| 6,522,948 B1 | 2/2003 | Benneweis |
| 6,598,944 B1 | 7/2003 | Wolff et al. |
| 6,606,542 B2 | 8/2003 | Hauwiller et al. |
| 6,678,580 B2 | 1/2004 | Benneweis |
| 6,698,368 B2 | 3/2004 | Cresswell |
| 6,708,080 B2 | 3/2004 | Benneweis |
| 6,755,390 B2 | 6/2004 | Masuda et al. |
| 6,776,355 B2 | 8/2004 | Ringer et al. |
| 6,853,276 B2 | 2/2005 | Smith |
| 6,877,675 B2 | 4/2005 | Benneweis |
| 6,877,717 B2 | 4/2005 | Collins et al. |
| 6,959,907 B2 | 11/2005 | Hironaka |
| 6,994,406 B1 | 2/2006 | Krawczyk et al. |
| 7,124,964 B2 | 10/2006 | Bui |
| 7,195,027 B2 | 3/2007 | Goossens et al. |
| 7,243,899 B2 | 7/2007 | Acar et al. |
| 7,347,221 B2 | 3/2008 | Berger et al. |
| 7,395,769 B2 | 7/2008 | Jensen |
| 7,441,746 B2 | 10/2008 | Sugiyama |
| 7,490,564 B2 | 2/2009 | Allan et al. |
| 7,626,288 B2 | 12/2009 | Protze |
| 7,690,440 B2 | 4/2010 | Dean et al. |
| 7,694,638 B1 | 4/2010 | Riewerts et al. |
| 7,706,926 B2 | 4/2010 | Peterson |
| 7,848,865 B2 | 12/2010 | Di Federico et al. |
| 8,141,504 B2 | 3/2012 | Dean et al. |
| 8,186,288 B2 | 5/2012 | Chinkiwsky |
| 8,191,795 B2 | 6/2012 | Grimm et al. |
| 8,191,798 B2 | 6/2012 | Hahn et al. |
| 8,246,004 B2 | 8/2012 | Kratzer |
| 8,488,874 B2 | 7/2013 | Zaman et al. |
| 8,523,085 B2 | 9/2013 | Grimm et al. |
| 8,590,859 B2 | 11/2013 | Kurz |
| 8,634,993 B2 | 1/2014 | McClure |
| 8,635,963 B2 | 1/2014 | Friggstad |
| 8,701,707 B2 | 4/2014 | Moosmann et al. |
| 8,844,838 B2 | 9/2014 | Funseth et al. |
| 8,919,676 B2 | 12/2014 | Funseth et al. |
| 9,052,031 B2 | 6/2015 | Leidig |
| 9,073,070 B2 | 7/2015 | Funseth et al. |
| 9,080,684 B2 | 7/2015 | Stahr |
| 9,266,124 B2 | 2/2016 | Humpal |
| 9,453,585 B2 | 9/2016 | Sato et al. |
| 9,470,332 B2 | 10/2016 | Miura |
| 9,506,578 B2 | 11/2016 | Lee |
| 9,702,475 B2 | 7/2017 | Scheffel et al. |
| 9,781,916 B2 | 10/2017 | Preheim et al. |
| 2002/0030119 A1 | 3/2002 | Proharam |
| 2002/0107609 A1 | 8/2002 | Benneweis |
| 2003/0070597 A1 | 4/2003 | Cresswell |
| 2004/0036048 A1 | 2/2004 | Petersen |
| 2004/0104370 A1 | 6/2004 | Suzuki |
| 2005/0048196 A1 | 3/2005 | Yanagita et al. |
| 2005/0051749 A1 | 3/2005 | Lee |
| 2005/0092951 A1 | 5/2005 | Groetzinger |
| 2005/0125083 A1 | 6/2005 | Kiko |
| 2005/0173979 A1 | 8/2005 | Voss |
| 2006/0097210 A1 | 5/2006 | Fong et al. |
| 2006/0237562 A1 | 10/2006 | Hedegard |
| 2006/0273189 A1 | 12/2006 | Grimm et al. |
| 2008/0114497 A1 | 5/2008 | Giles et al. |
| 2008/0283633 A1 | 11/2008 | Nozaki et al. |
| 2008/0296398 A1 | 12/2008 | Hickman et al. |
| 2009/0112372 A1 | 4/2009 | Peterson |
| 2009/0134237 A1 | 5/2009 | Giles |
| 2009/0184182 A1 | 7/2009 | Beeren |
| 2010/0032492 A1 | 2/2010 | Grimm et al. |
| 2010/0101469 A1 | 4/2010 | Landphair et al. |
| 2010/0269921 A1 | 10/2010 | Pifer et al. |
| 2011/0054743 A1 | 3/2011 | Kocer et al. |
| 2011/0160920 A1 | 6/2011 | Orr et al. |
| 2011/0179984 A1 | 7/2011 | Beaujot et al. |
| 2011/0204272 A1 | 8/2011 | Kratzer |
| 2012/0045013 A1 | 2/2012 | Chen et al. |
| 2012/0080624 A1 | 4/2012 | Stahr et al. |
| 2012/0168530 A1 | 7/2012 | Ellingson et al. |
| 2012/0169495 A1 | 7/2012 | Kowalchuk |
| 2012/0174843 A1 | 7/2012 | Friggstad |
| 2012/0195496 A1 | 8/2012 | Zaman et al. |
| 2012/0211508 A1 | 8/2012 | Barsi et al. |
| 2012/0216732 A1 | 8/2012 | Ballard et al. |
| 2012/0228395 A1 | 9/2012 | Needham |
| 2012/0271467 A1 | 10/2012 | Grimm et al. |
| 2013/0032737 A1 | 2/2013 | Neilson et al. |

(56) References Cited

U.S. PATENT DOCUMENTS

| | | | |
|---|---|---|---|
| 2013/0037633 A1 | 2/2013 | Walter et al. |
| 2013/0092746 A1 | 4/2013 | Scott et al. |
| 2013/0292590 A1 | 11/2013 | Stahr |
| 2013/0306894 A1 | 11/2013 | Weis et al. |
| 2013/0320106 A1 | 12/2013 | Schmidt |
| 2014/0014863 A1 | 1/2014 | Najmolhoda et al. |
| 2014/0026995 A1 | 1/2014 | Mayr et al. |
| 2014/0084196 A1 | 3/2014 | Heyer et al. |
| 2014/0091243 A1 | 4/2014 | Leidig |
| 2014/0263709 A1 | 9/2014 | Kocer et al. |
| 2014/0277780 A1 | 9/2014 | Jensen et al. |
| 2014/0299673 A1 | 10/2014 | Grimm et al. |
| 2014/0333398 A1 | 11/2014 | Nila et al. |
| 2014/0361094 A1 | 12/2014 | Michael |
| 2015/0367352 A1 | 12/2015 | Burchardt |
| 2015/0367357 A1 | 12/2015 | Humpal et al. |
| 2015/0367358 A1 | 12/2015 | Funseth et al. |
| 2015/0375247 A1 | 12/2015 | Funseth et al. |
| 2016/0015020 A1 | 1/2016 | Needham et al. |
| 2016/0017792 A1 | 1/2016 | Fletcher et al. |
| 2016/0044862 A1 | 2/2016 | Kocer et al. |
| 2016/0084382 A1 | 3/2016 | Pisasale |
| 2016/0136671 A1 | 5/2016 | Kocer |
| 2016/0175869 A1 | 6/2016 | Sullivan et al. |
| 2016/0178422 A1 | 6/2016 | Humpal et al. |
| 2016/0227755 A1 | 8/2016 | Preheim et al. |
| 2016/0251008 A1 | 9/2016 | Jeon et al. |
| 2017/0018345 A1 | 1/2017 | Raff et al. |
| 2017/0079200 A1 | 3/2017 | Posselius et al. |
| 2017/0284285 A1 | 10/2017 | Lenk et al. |
| 2017/0314580 A1 | 11/2017 | Steensma et al. |
| 2018/0042214 A1 | 2/2018 | Preheim et al. |

FOREIGN PATENT DOCUMENTS

| | | |
|---|---|---|
| AU | 2012201357 A1 | 9/2012 |
| AU | 2013203361 A1 | 10/2013 |
| AU | 2013204455 A1 | 3/2014 |
| CA | 2549300 A1 | 12/2006 |
| CA | 2674527 A1 | 2/2010 |
| CA | 2770013 A1 | 9/2012 |
| CA | 2811726 A1 | 10/2013 |
| CA | 2813949 A1 | 2/2014 |
| CN | 202255911 U | 5/2012 |
| CN | 102266829 B | 12/2012 |
| CN | 203264929 U | 11/2013 |
| EP | 0963255 B1 | 10/2002 |
| EP | 0847307 B2 | 1/2003 |
| GB | 2322573 A | 9/1998 |
| JP | 2000139245 A | 5/2000 |
| JP | 2005-161221 A | 6/2005 |
| WO | WO-97/12688 A1 | 4/1997 |
| WO | WO-2014210043 A1 | 12/2014 |
| WO | WO-2015/058091 A1 | 4/2015 |
| WO | WO-2017/192625 A1 | 11/2017 |
| WO | WO-2017/223252 A1 | 12/2017 |
| WO | 2018129323 | 7/2018 |
| WO | 2018129376 | 7/2018 |

OTHER PUBLICATIONS

"Canadian Application Serial No. 2,926,448, Office Action dated Jan. 5, 2018", 5 pgs.
U.S. Appl. No. 15/029,935, filed Apr. 15, 2016, Nozzle Control System and Method.
U.S. Appl. No. 15/703,818, filed Sep. 13, 2017, Nozzle Control System and Method.
U.S. Appl. No. 15/585,034, filed May 2, 2017, Interface Resist Valve Assemblies and Methods for Same.
"International Application Serial No. PCT/US2017/038622, International Search Report dated Sep. 28, 2017", 2 pgs.
"International Application Serial No. PCT/US2017/038622, Written Opinion dated Sep. 28, 2017", 5 pgs.
"U.S. Appl. No. 15/029,935, Final Office Action dated Jul. 11, 2017", 6 pgs.
"U.S. Appl. No. 15/029,935, Non Final Office Action dated Mar. 30, 2017", 21 pgs.
"U.S. Appl. No. 15/029,935, Notice of Allowance dated Aug. 29, 2017", 5 pgs.
"U.S. Appl. No. 15/029,935, Preliminary Amendment filed Apr. 15, 2016", 3 pgs.
"U.S. Appl. No. 15/029,935, Reponse filed Aug. 16, 2017 to Final Office Action dated Jul. 11, 2017", 11 pgs.
"U.S. Appl. No. 15/029,935, Response filed Jun. 15, 2017 to Non Final Office Action dated Mar. 30, 2017", 12 pgs.
"Application Serial No. PCT/US2014/061150, International Preliminary Report on Patentability dated Oct. 16, 2015", 10 pgs.
"International Application Serial No. PCT/US2014/061150, International Search Report dated Feb. 4, 2015", 2 pgs.
"International Application Serial No. PCT/US2014/061150, Written Opinion dated Feb. 4, 2015", 7 pgs.
"International Application Serial No. PCT/US2017/030694, International Search Report dated Aug. 1, 2017", 3 pgs.
"International Application Serial No. PCT/US2017/030694, Written Opinion dated Aug. 1, 2017", 8 pgs.
Elmore, Clyde L., "Soil Solarization a Nonpesticidal Method for Controlling Diseases, Nematodes, and Weeds", University of California Division of Agriculture and Natural Resources Publication 21377, (1-17), 1997.
"U.S. Appl. No. 14/899,946, Non Final Office Action dated Mar. 26, 2018", 37 pgs.
"Canadian Application Serial No. 2,926,448, Response filed Jun. 26, 2018 to Office Action dated Jan. 5, 2018", 19 pgs.
"International Application Serial No. PCT/US2014/043926, International Preliminary Report on Patentability dated Jan. 7, 2016", 11 pgs.
"International Application Serial No. PCT/US2014/043926, International Search Report dated Nov. 3, 2014", 2 pgs.
"International Application Serial No. PCT/US2014/043926, Written Opinion dated Nov. 3, 2014", 9 pgs.
"International Application Serial No. PCT/US2017/030694, International Preliminary Report on Patentability dated May 29, 2018", 23 pgs.
"International Application Serial No. PCT/US2017/030694, Response filed Mar. 2, 2018 to Written Opinion dated Aug. 1, 2017", 4 pgs.
"International Application Serial No. PCT/US2018/012590, International Search Report dated Apr. 13, 2018", 4 pgs.
"International Application Serial No. PCT/US2018/012590, Invitation to Pay Additional Fees and Partial Search Report dated Feb. 21, 2018", 2 pgs.
"International Application Serial No. PCT/US2018/012590, Written Opinion dated Apr. 13, 2018", 13 pgs.
"International Application Serial No. PCT/US2018/012661, International Search Report dated Jun. 21, 2018", 4 pgs.
"International Application Serial No. PCT/US2018/012661, Invitation to Pay Additional Fees and Partial Search Report dated Mar. 15, 2018", 2 pgs.
"International Application Serial No. PCT/US2018/012661 , Written Opinion dated Jun. 21, 2018", 9 pgs.
"U.S. Appl. No. 14/899,946, Response filed Aug. 27, 2018 to Non Final Office Action dated Mar. 26, 2018", 27 pgs.
"U.S. Appl. No. 15/585,034, Non Final Office Action dated Nov. 2, 2018", 25 pgs.
"U.S. Appl. No. 15/703,818, Non Final Office Action dated Oct. 11, 2018", 6 pgs.
"Canadian Application Serial No. 2,926,448, Examiner's Rule 30(2) Requisition dated Oct. 3, 2018", 3 pgs.

NOZZLE CONTROL SYSTEM AND METHOD

CLAIM OF PRIORITY

This application is a continuation-in-part of U.S. patent application Ser. No. 15/029,935, filed Apr. 15, 2016, which is a U.S. National Stage Filing under 35 U.S.C. 371 from International Application No. PCT/US2014/061150, filed Oct. 17, 2014, and published as WO 2015/058091 on Apr. 23, 2015, which claims the benefit of priority to U.S. Provisional Patent Application Ser. No. 61/892,339, filed on Oct. 17, 2013. This application also claims priority to U.S. Provisional Patent Application Ser. No. 62/352,778, filed Jun. 21, 2016, which applications are incorporated herein in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries; Sioux Fails, S. Dak.; All Rights Reserved.

TECHNICAL FIELD

This document pertains generally, but not by way of limitation, to a nozzle control system and method for the application of products to crops or a field.

BACKGROUND

Agricultural sprayers are used to distribute agricultural products, such as fertilizers, insecticides, herbicides and fungicides, to a field or crops. Agricultural sprayers include one or more distribution booms that are long enough (e.g., 60 feet to 150 feet) to spray multiple rows of crops in a single pass. Agricultural fields are often irregular in shape and contain one or more of contour changes, tree lines, hillsides, ponds, or streams. Irregular shapes and contour changes can provide challenges in even distribution of agricultural products and can lead to waste of the agricultural product. Additionally, the configuration of the agricultural sprayer itself may cause unpredictable variation in application of the agricultural product.

Agricultural sprayers include a reservoir for a carrier substance. The reservoir is in communication, by way of a header tube, or pipe, with a plurality of sections provided along one or more carrier booms (e.g., boom tubes along the booms). The header is the main line extending between the reservoir and the carrier booms. Each of the plurality of sections includes multiple sprayer nozzles that distribute the carrier substance received by the section. The carrier substance includes the carrier substance, such as water, and, in one example, agricultural products dispersed into the carrier substance, for instance herbicides, pesticides, fertilizers, or the like.

BRIEF DESCRIPTION OF THE DRAWINGS

The drawings illustrate generally, by way of example, but not by way of limitation, various embodiments discussed in the present document.

DETAILED DESCRIPTION

Figure 1:
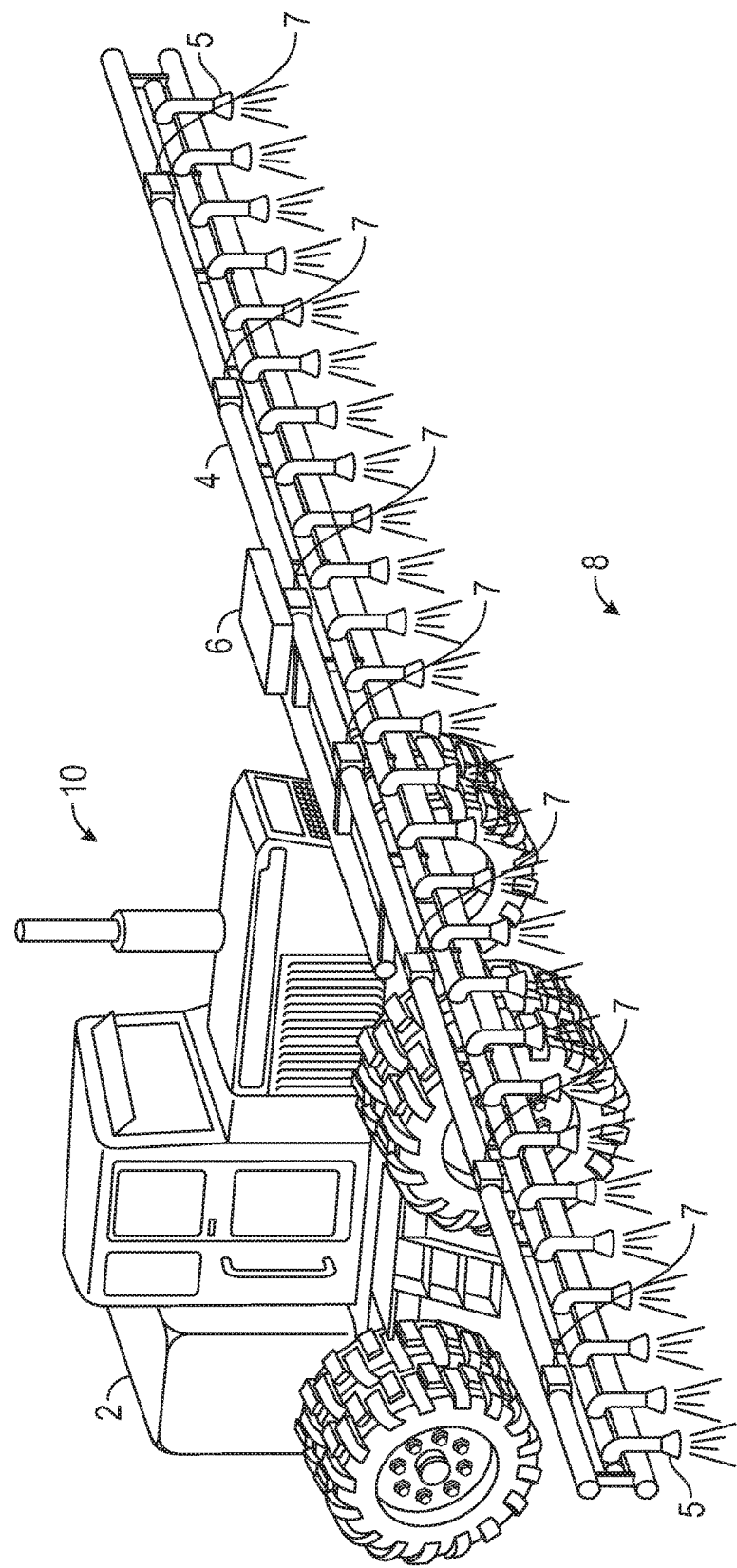
FIG. 1 is a perspective view of one example of an agricultural sprayer.

As illustrated in FIG. 1, an agricultural sprayer 10 includes a reservoir tank 2, one or more sprayer booms 4, including one or more nozzles 5, one or more electronic control units (ECU) 7 (e.g., a microprocessor based system), and a master node 6. (e.g., a microprocessor based system) In an example, the agricultural sprayer 10 includes an integral reservoir tank 2 or a tow behind reservoir tank. The reservoir tank 2, in an example, includes the agricultural product mixed with a carrier fluid, such as water, or the carrier fluid and the agricultural product are mixed in-line prior to or at the sprayer boom 4. The nozzles 5 are positioned along the sprayer boom 4 to deliver the agricultural product to a crop or an agricultural field 8. Crops include, but are not limited to, any product grown in an agricultural field, such as row and non-row based crops. Agricultural products include, but are not limited to, fertilizers, water, pesticides, fungicides, herbicides, or the like. As shown, the agricultural sprayer 10 includes master node 6, as described herein. The master node 6, as will be discussed herein, operates in conjunction with the one or more ECU 7 to control delivery of the agricultural product from the reservoir tank 2, to the sprayer boom 4 and the associated nozzles 5 for delivery to the agricultural field or crop.

Figure 2:
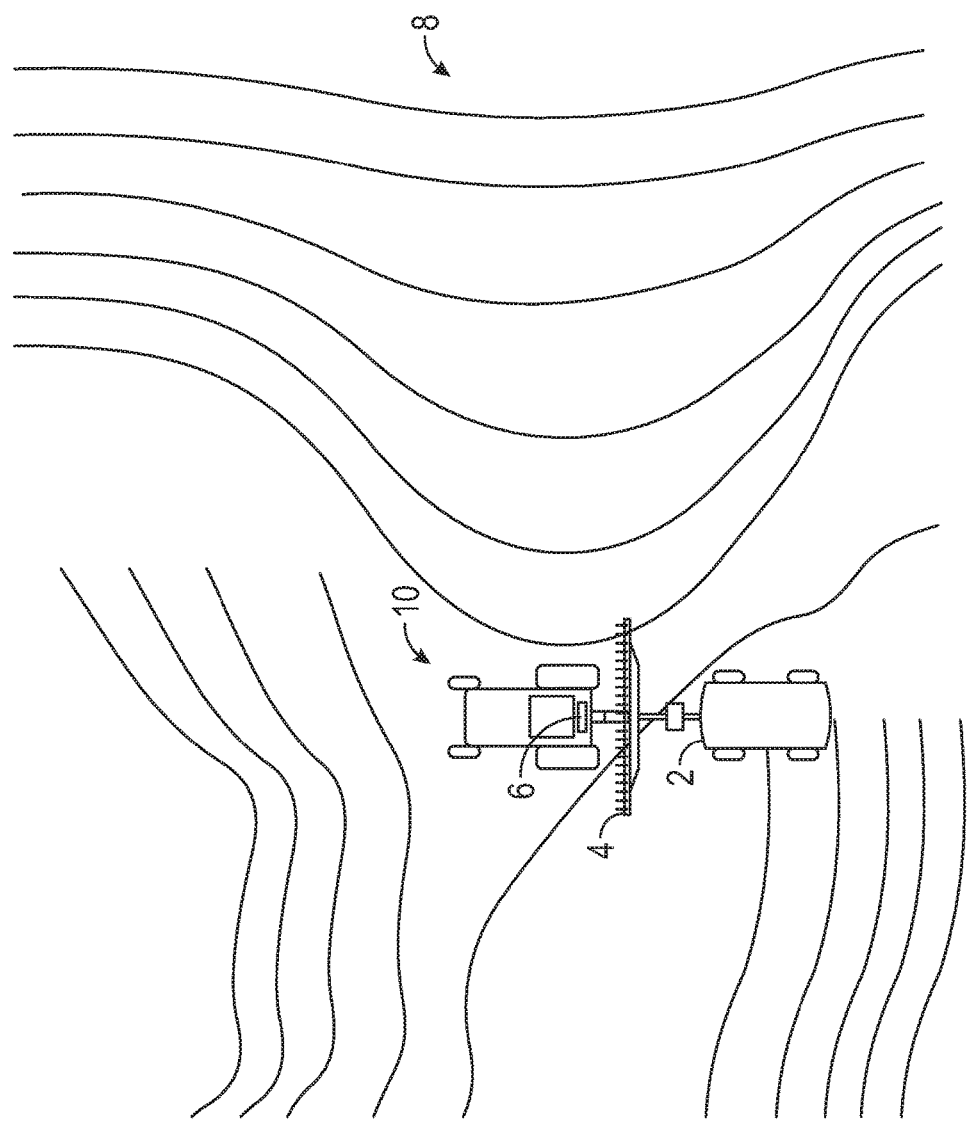
FIG. 2 is a top view of one example of an agricultural sprayer and an agricultural field.

As illustrated in FIG. 2, an example of an agricultural sprayer 10 is provided in an agricultural field 8 and delivering an agricultural product. The agricultural sprayer 10 includes a tow behind reservoir tank 2, one or more sprayer booms 4 (e.g., dual booms extending from the center of the sprayer 10), and the master node 6. As described herein, the controller 6 controls delivery of the agricultural product to the agricultural field 8 or crops.

Figure 3:
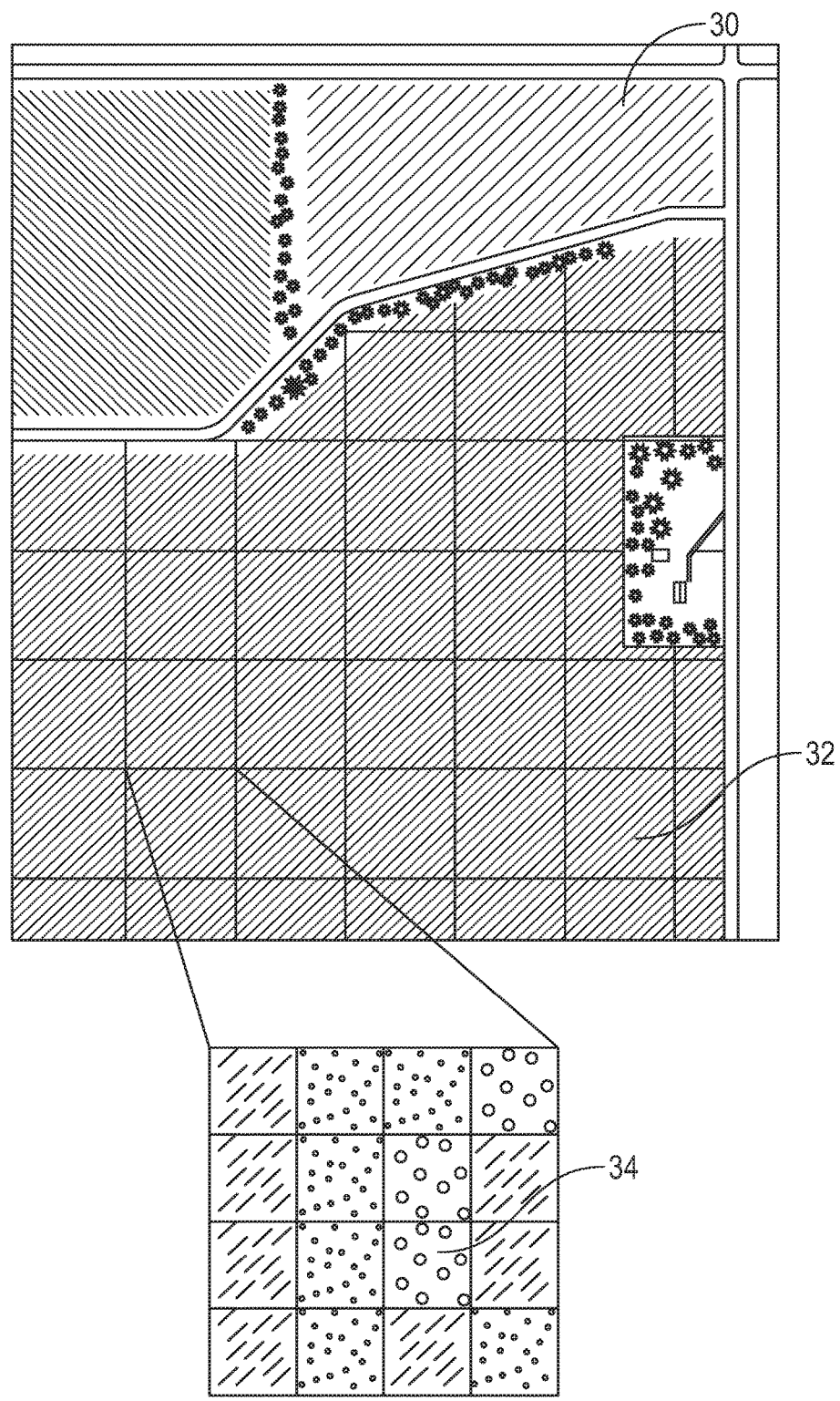
FIG. 3 is one example of a field moisture content map including crop moisture content values associated with corresponding field locations.

FIG. 3 is a demonstrative example of a field map 30. Optionally the yield map 30 includes but is not limited to providing a visual representation of agricultural product delivery instructions, such as, but not limited to, a soil characteristic, crop yield, agricultural product instructions, or any combination thereof. A zoomed in portion of the field map 30 is shown in the bottom view of FIG. 3. As shown by way of varying stippling, shading, or the like a plurality of zones 32 accordingly has corresponding agricultural product delivery instructions (e.g., agricultural product type or flow rate, etc.), magnitude of the comparison, or type of calibration instruction. For instance, as shown in FIG. 3, a plurality of zones 32 having a varying agricultural product delivery instructions are associated with the one or more zones 32. Accordingly each of the zones 32 includes in one example an array of information including the agricultural product delivery instructions. The field map 30 accordingly provides a representation to the operator of the agricultural product delivery demands during an agricultural product delivery operation. Information provided by the field map 30 is optionally used for instance to determine better husbandry techniques, planting strategies and the like for the field in the next season.

Referring again to FIG. 3, the plurality of zones 32 include sub-zones 34. As shown, each of the zones and sub-zones has different stippling, shading or the like associated with the true harvested crop characteristic. Optionally the sub-zones 34 (or any of the plurality of zones 32) have varying stippling, shading or coloring techniques or any combination thereof to accordingly provide indications of calibration instructions, magnitude of comparisons, or both. As shown in FIG. 3, by way of the stippling, shading, coloring or the like the agricultural product delivery instructions vary between each of the zones 32. As shown for instance, each of the sub-zones 34 the stippling is different between the zones thereby indicating agricultural product delivery instructions, such as agricultural product type, there between varies. Optionally the field map 30 provides one or more interactive zones 32. For instance the user is able to zoom in and examine each of the zones 32 accordingly allowing for instance through a graphical user interface interaction with the field map 30 to accordingly determine the agricultural product delivery instructions of one or a plurality of the zones 32.

Figure 4:
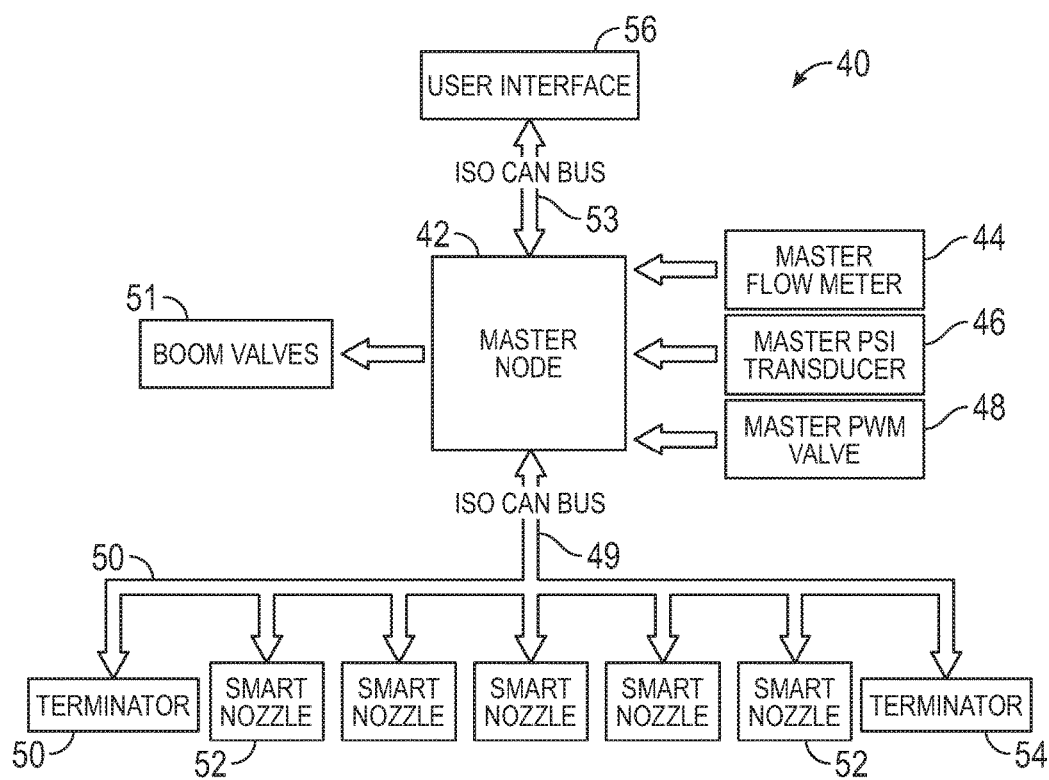
FIG. 4 is an exemplary schematic view of an overall nozzle control system.

FIG. 4 illustrates a schematic of an exemplary overall nozzle control system 40, wherein one or more nozzles 52 located on a boom 50 are capable of controlling a respective nozzle flow rate of an agricultural product dispensed from the nozzle 52. As shown in FIG. 4, a master node 42 is further communicatively coupled to one or more valves of the boom 51, such that system pressure within the boom 50 can be controlled by the master node 42. However, unlike prior systems, the master node 42 of the current system is not configured to control the flow rate within the system 40, boom 50, or at the smart nozzles 52. The master node 42 includes inputs from a master flowmeter 44, a master pressure transducer 46, and a master pulse width modulation (PWM) valve 48. The master node controls 42 the master PWM valve 48 so as to maintain the targeted system pressure, such that a desired droplet size of the agricultural product is obtained out of the nozzles 52. For example, environmental conditions, such as wind, humidity, rain, or temperature, field characteristics, or user preference determine whether a smaller or larger droplet size of the agricultural product is preferred. By maintaining a constant system pressure, the preferred droplet size can be obtained and maintained by the current system.

Figure 5:
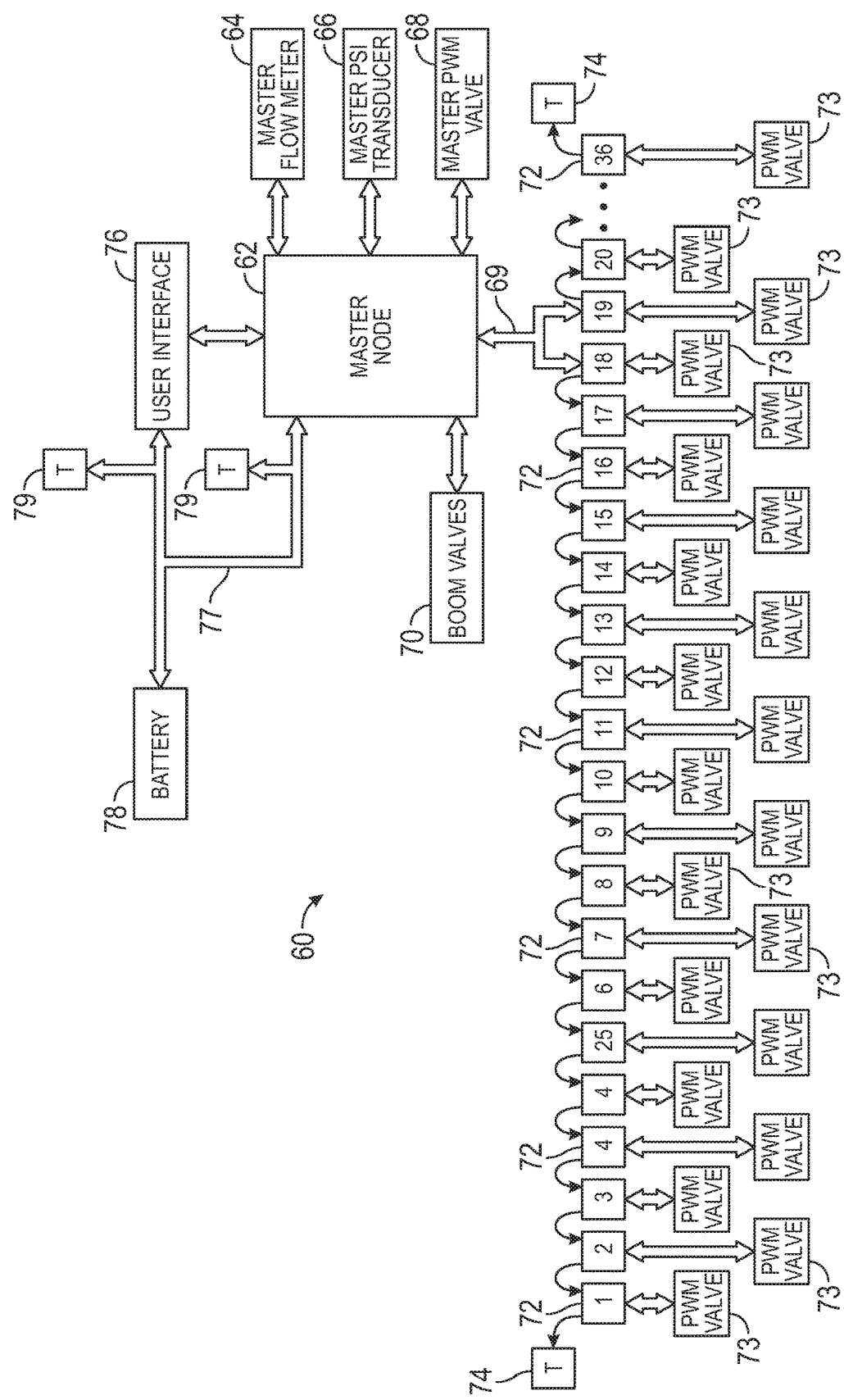
FIG. 5 is a detailed schematic view of an exemplary nozzle control system.

In the exemplary embodiment, each of the nozzles 52 is a smart nozzle that includes an electronic control unit (ECU) that regulates, determines, and/or controls the nozzle flow rate of the agricultural product dispensed from the nozzle 52, as discussed in reference to FIG. 5. In other embodiments, a group of nozzles 52 are associated with a common ECU and as a group be considered a single smart nozzle. The smart nozzles 52 are connected to a boom 50 and communicatively coupled to a controller area network 49 (e.g., ISO CAN bus) of the overall control system 40. As discussed herein, the CAN bus 49 is configured to provide overall system information from the master node 42 (e.g., master node). The ECU at each smart nozzle 52 uses data from the overall system information to regulate, determine, and/or control the nozzle flow rate of each corresponding smart nozzle 52.

The master node 42 controls a system pressure using, for example, the master PSI transducer 46 and the master pulse width modulation (PWM) valve 48, instead of controlling a system flow rate. Although FIG. 4 illustrates a PWM valve as the master valve 48, embodiments are not so limited. For example, the master valve 48 includes any valve capable of controlling pressure of a system, such as, for example, a ball valve, a PWM valve, or a butterfly valve. For instance, the master node 42 maintains the system pressure at a target system value in contrast to affirmatively controlling the agricultural product flow rate, and the flow rate is controlled at each smart nozzle 52. In another example, the master node controls the system pressure to one or more target values and the smart nozzles 52 control the flow rate at each of the smart nozzles 52 and, therefore, the overall agricultural product flow rate of the system.

In an example, the target system pressure is provided by a user, such as at the User Interface 56 (UI) connected to the master node 42 by the ISO CAN bus 53. In an additional example, the user also provides a target system flow rate (e.g., volume/area) at the UI. In an example, the master node 42 provides the target system flow rate to each of the one or more smart nozzle 52, such that each smart nozzle 52 (or each ECU, as discussed herein) determines an individual agricultural product flow rate for the smart nozzle 52. For example, the system target flow rate is divided by the number of nozzles to provide 52 a target agricultural product flow rate for each of the one or more nozzles 52. In an example, the master node measures the flow rate (e.g., volume per time) with a master flow meter 44 and compares it with the overall target flow rate (e.g., designated by one or more of the user, crop type, soil characteristic, agricultural product type, historical data, or the like). The master node 42 is configured to determine a difference or error, if present, between the measured system flow rate and the target system flow rate. In such an example, the master node 42 provides the determined difference, by the ISO CAN bus 53, to the individual nozzles 52 (or ECUs, as discussed herein). The one or more nozzles 52 receive the difference on the CAN bus 53 and adjust their pressure/flow/duty cycle curve using the difference (e.g., compensating for errors in the system) to reduce the error between the measured and target system flow rates.

Additionally, in at least some examples, the master node 42 reports the actual pressure, measured by the master PSI transducer 46, as well as boom 50 information, including, but not limited to, one or more of yaw rate, speed, number of smart nozzles of the boom, distance between smart nozzles on the boom, to the smart nozzles 52 (or ECUs, as described herein) for individual flow rate control of each of the smart nozzles 52. For example, the information provided from the master node 42 is used in addition to nozzle characteristics to control the individual flow rate control of each smart nozzle 52. Nozzle characteristics include, but are not limited to nozzle position on a boom, length of the boom, nozzle spacing, target flow rate for the system, yaw rate of the boom, yaw rate of the agricultural sprayer, speed of the agricultural sprayer, the overall system pressure, and agricultural product characteristics. The system 40 is configured to be installed on an agricultural sprayer, and as such, since the sprayer moves during operation (translates and rotates), the one or more nozzle characteristics, in an example, are dynamic and accordingly changes the individual flow rate.

FIG. 5 illustrates a detailed schematic view of an exemplary nozzle control system 60. The control system 60 includes a master node 62 communicatively coupled to one or more valves of the boom 70, such that system pressure within the boom can be controlled by the master node 62. Further, the master node 62 includes inputs from a master flowmeter 64, a master pressure transducer 66, and a master pulse width modulation (PWM) valve 68. Further, as described herein, the master node is coupled to a UI 76 and, in an example, a battery 78, so as to provide power to one or more of the master node 62 and UI 76.

As shown in the embodiment of FIG. 5, a smart nozzle includes an ECU 72 coupled to a PWM valve 73. That is, FIG. 5 illustrates 36 ECUs relating directly to 36 nozzles of the nozzle control system 60, but embodiments are not so limited. A master node 62 is communicatively coupled, by ISO CAN bus 69 to ECU-18 and ECU-19, wherein ECU-18 72 and ECU-19 72 define a center region of the boom. From the center region of the boom, the ECUs 72 are communicatively coupled to the most proximate ECU 72 in the direction toward each terminal end 74 of the boom. That is, ECU-18 is communicatively couple to ECU-17, which is communicatively coupled to ECU-16, and so forth until the terminator after ECU-1 is reached. The same pattern holds for the other half of the boom. Although 36 ECUs 72 are illustrated, embodiments are not so limited. Further, as shown in FIG. 5, each ECU 72 is coupled to one PWM valve 73, however, embodiments are not so limited. For example, a single ECU 72 is communicatively coupled to more than one PWM valve 73. Said another way, a single ECU 72, in an example, is communicatively coupled to more than one nozzle, such as, for example, every other nozzle. In an example, 12 ECUs split control of the 36 nozzles of the boom. In an example, a plurality of nozzles are partitioned into nozzle groups, such that each nozzle group includes an ECU 72 configured to control a nozzle group flow rate of the agricultural product dispensed from each nozzle of the nozzle group based on the nozzle characteristics, as described herein, of the respective nozzles. Benefits of such embodiments include reducing costs. Thus, a smart nozzle is a single nozzle and an associated ECU or is a group of nozzles associated with a common ECU.

In still another example, the system 60 includes one or more location fiducials associated with the system 60, the one or more location fiducials are configured to mark the location of one or more nozzles (or ECUs) of the plurality of nozzles on a field map (e.g., indexed with product flow rates, moisture content, crop type, agricultural product type, or the like). Optionally, each of the nozzles, nozzle groups, or ECUs 72 of the system is configured to control the agricultural product at individual rates according to the location the one or more nozzles (or ECUs 72) of the plurality of nozzles on the field map (and optionally in addition to the nozzle characteristics described herein). Further, the each of the plurality of nozzles (or ECUs 72) can be cycled, such as on/off, according to the nozzle's (or nozzle group's or ECU's 72) location on the field. This is in contrast to previous approaches which required all the nozzles of a section of the boom to be shut off or turned on at the same time.

In an example, each nozzle ECU 72 is programmable to receive, track, or manipulate designated nozzle control factors. For example, each ECU 72 focuses on nozzle spacing, target flow rate for the system, and speed of the agricultural sprayer while ignoring yaw rate, nozzle location on the field, etc. Such examples provide the benefit of simplifying the system to user specifications, provide greater programmability of the system, and providing cost effective nozzle specific flow rate solutions. In yet another example, the ECUs 72 associated with each nozzle are instead consolidated into one or more centralized nodes that determine the individual flow rates of each of the respective nozzles in a similar manner to the previously described ECUs 72 associated with each of the nozzles.

Figure 6:
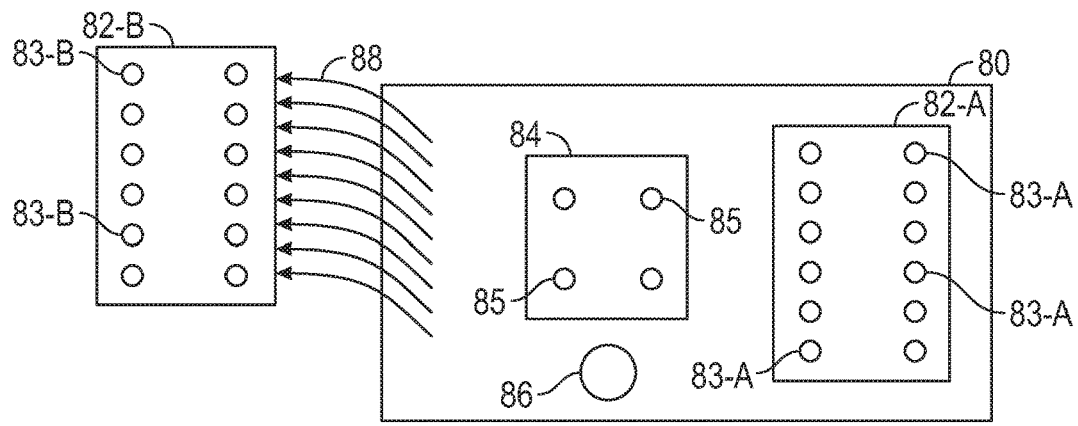
FIG. 6 is an exemplary schematic view of a nozzle ECU.

FIG. 6 is an exemplary schematic view of an ECU 80. The ECU 80 includes two connectors, including a 4-pin thermistor 84 and a 12-pin connector 82-A, and an LED 86. The LED 86, in an example, is indicates the readiness state of the smart nozzle. In an example, the LED 86 is a multi-color LED, wherein a specific color shown along with a rate at which the LED 86 flashes indicates if the smart nozzle is in an error mode, including what type of error, warning state, ready state, actively controlling state, or the like. The 4-pin thermistor 84 includes, in an example, a number of control aspects, such as, but not limited to, valve and thermistor. The 12-ping connector 82-A includes, in an example, a number of control aspects, such as but not limited to any specific configuration, power, ground, nozzle startup, location recognition. Such pin indexing, in an example, is applicable to a smart nozzle or the ISO CAN bus. The lines with arrows signify 88 a cable to daisy-chain ECU 82-A to a 12-pin connector 82-B including pins 83-B, although embodiments are not so limited. The ECU 80 controls the nozzle flow rate based on a number of parameters, including, but not limited to: speed of the sprayer or boom, yaw rate, target system flow rate (e.g. volume/area), and on/off command at runtime. Such parameters permits the ECU 80 to calibrate the duty cycle curve (e.g., the duty cycle curve provided by a nozzle manufacturer) of each smart nozzle needed to achieve the target nozzle flow rate of each of the smart nozzles. Each smart nozzle is further configured according to nozzle spacing on the boom, location on the boom, and nozzle type. Further, each smart nozzle can regulate or control the nozzle flow rate based on the location of the nozzle in the field (as described above).

In an example, the ECU 80 further includes the thermistor 84 so as to provide temperature sensitive control of the nozzle. For example, as power is provided to the thermistor 84, the thermistor 84 heats up, consequently changing the resistivity of the thermistor 84. The agricultural product flows over the thermistor 84, reducing the heat of the thermistor 84 and altering the resistivity of the thermistor 84. In an example, the changes in resistivity of the thermistor 84 are used to indicate or determine that a nozzle is fouled, clogged, or the like. In another example, a pressure sensor or transducer is configured to measure the pressure after each of the PWM valves (e.g., 73, FIG. 5). In an example the pressure transducer is attached to each smart nozzle or plugged as an add-on feature.

In a further example, the overall system data (e.g., actual flow rate compared to targeted flow rate, maintained pressure vs. targeted pressure, etc.) is used to calibrate one or more thermistors. The calibrated thermistor 84 of the smart nozzle is then used to further calibrate the duty cycle curve of the corresponding smart nozzle. Benefits of such examples, provide a more accurate, configurable, and efficient smart nozzle for application of an agricultural product.

Figure 7:
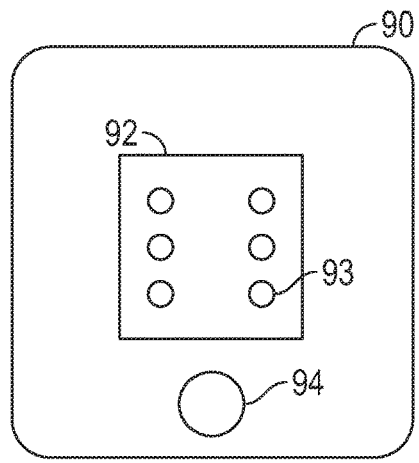
FIG. 7 is an alternative exemplary schematic view of a nozzle ECU.

FIG. 7 illustrates an alternative exemplary view of an ECU 90. The ECU 90 includes a 6-pin 93 connector 92 and an LED 94 on the circuit board. In such an example, each ECU 90 is wired to one another or wired to a centrally located hub. Although nozzle control systems and methods described herein and shown in FIGS. 1 and 2 reference a PWM master valve communicatively coupled to the master node, embodiments are not so limited. For example, other valves are contemplated. Further, examples herein are described in relation to an agricultural sprayer, but other embodiments, such as, but not limited to, planters or toolbars, are contemplated.

Figure 8:
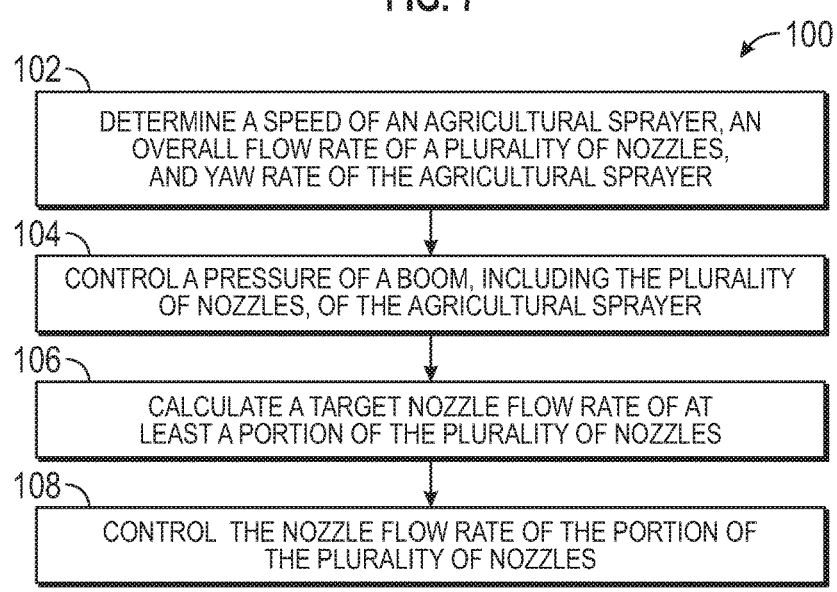
FIG. 8 is a block diagram showing one example of a method for controlling nozzle flow rate on an agricultural sprayer.

FIG. 8 is a block diagram showing one example of a method 100 for controlling nozzle flow rate on an agricultural sprayer having a boom with a plurality of nozzles. In describing the method 100, reference is made to features and elements previously described herein, although not numbered. At 102, the method 100 includes determining a speed of an agricultural sprayer, an overall flow rate of a plurality of nozzles, and yaw rate of the agricultural sprayer. In an example, the speed of the agricultural sprayer is determined by a GPS module, an accelerometer, a speedometer, tachometer, or the like. In an example, the overall flow rate of the plurality of nozzles is determined by a sum of the individual flow rates of each of the plurality of nozzles or is measured by a flow meter. In an example, the yaw rate is determined by a yaw sensor coupled to the boom, master node, or agricultural sprayer to detect a yaw of the hull and provide a yaw signal. At 104, a pressure of an agricultural product in a boom is controlled by a pressure valve in communication with the master node. At 106, the method 100 includes calculating, using at least one of the speed, the overall flow rate, and the yaw rate, a target nozzle flow rate of at least a portion of the plurality of nozzles. As described herein, at 108 the method 100 includes controlling the nozzle flow rate of the portion of the plurality of nozzles.

In an example, the method includes determining a boom section flow rate, including a portion of the plurality of nozzles, based on at least one of the speed, the overall flow rate, and the yaw rate and controlling the flow rate of the boom section. For example, the boom section corresponds to a nozzle group, as described herein, such as a plurality of nozzles controlled by a common ECU. As described herein, controlling includes controlling each of the nozzles of the plurality of nozzles to dispense the agricultural product at individual rates according to the location the one or more nozzles of the plurality of nozzles on a field map. Further, the current method 100 includes controlling the pressure of the boom is independent of controlling the nozzle flow rate of the portion of the plurality of nozzles.

Another example embodiment will now be described. In this embodiment, the master node handles a number of functions in the system. It communicates with the pump and a pressure sensor in order to regulate pressure in the system to a desired target pressure. It also communicates with a flow sensor to obtain an actual overall flow rate. The master node further receives vehicle speed data from a GPS system, yaw rate from a yaw sensor and a target volume/area of an agriculture product (typically input by a user).

The master node also provides error correction for the system by looping through each smart nozzle and calculating each smart nozzle's flow rate. The master node determines this flow rate based on vehicle speed, yaw rate, the location of the nozzle on the boom and the target volume per area. The master node then sums the flow rates and compares this sum to the actual overall system flow rate to determine an error percentage. The error percentage is then provided on the CAN bus for the smart nozzles to change their flow rate.

The master node also checks for saturation points in the flow range for the smart nozzles to make the percent error more accurate. For example, if the master node calculates a flow rate for a smart nozzle that exceeds the nozzle's maximum flow rate, then the master node uses the maximum nozzle flow rate rather than the calculated nozzle flow rate when summing the rates to determine an overall flow rate. The master node in this embodiment does not control the flow rates of the smart nozzles themselves.

Each smart nozzle independently calculates and controls its own flow rate based on CAN bus data from the master node. In an example, each nozzle performs its own flow rate calculation independent from the other nozzles. In particular, the master node transmits vehicle speed, yaw rate, boom width, location of each nozzle on the boom, target volume per area for the applied product, and the error correction. Using this data provided on the CAN bus, each smart nozzle determines its own flow rate, adjusted for the error correction determined by the master node.

The flow rate for a smart nozzle is obtained by multiplying various inputs together (e.g., speed, yaw rate, volume/area). The system (e.g., the master node) can also apply logic (such as if-then statements) to determine whether a smart nozzle should be on or off. For example, if there is an error or the master switch is off, the target rate may not be applied to the smart nozzle and the smart nozzle may be shut off.

Figure 9A:
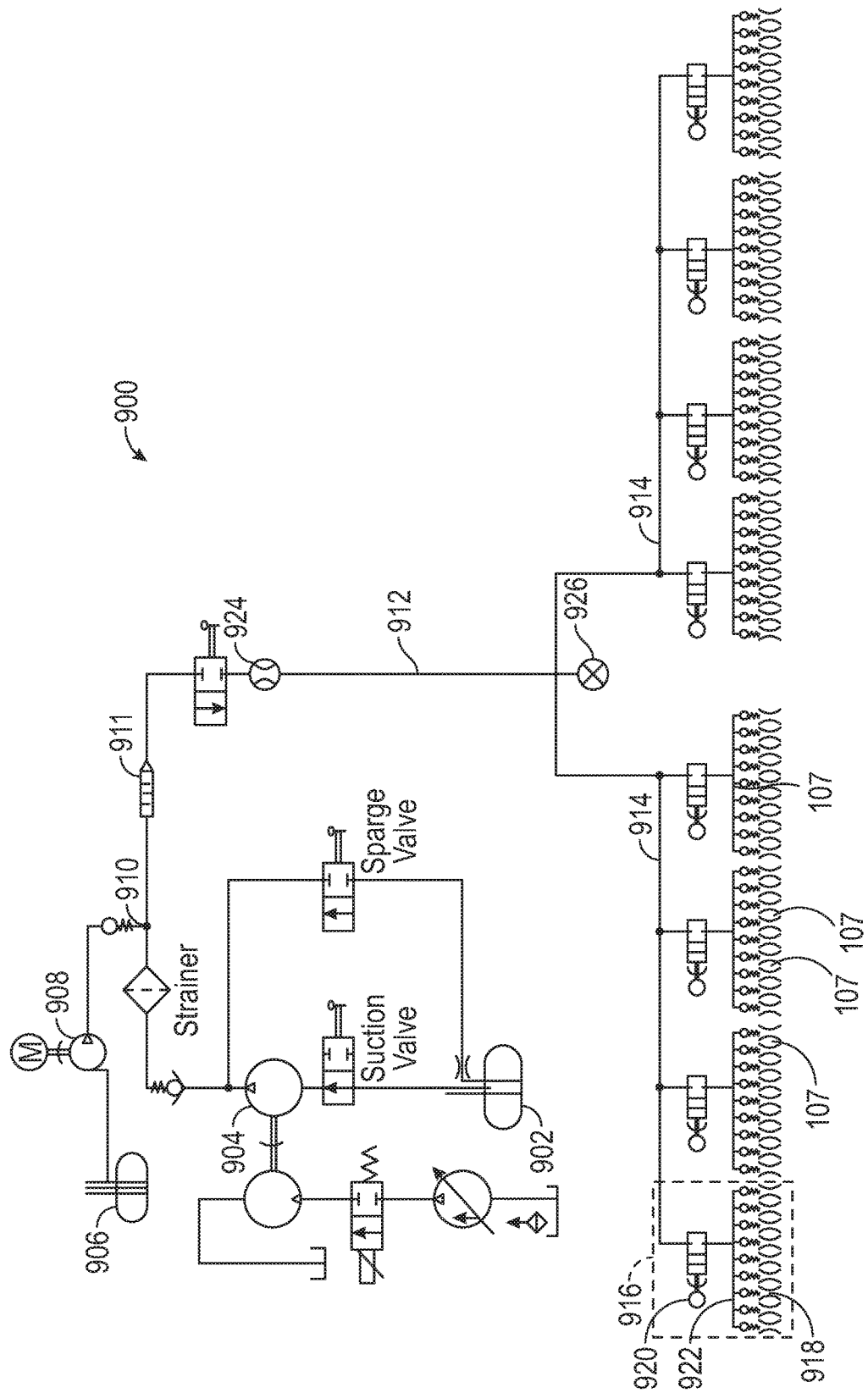
FIG. 9A is a schematic diagram of one example of an agricultural sprayer.

FIG. 9A shows one example of a sprayer 900 configured for use with the nozzle control systems described herein. The sprayer 900 shown in FIG. 9A includes a consolidated system having a product injection reservoir 906 and the injection pump 908 feeding into an injection port 910 of a header 912 of the sprayer 900. For instance, the carrier fluid of the agricultural product is pumped from a carrier reservoir 902 by a carrier pump 904 and supplemented with the injection product (e.g., one or more additives including fertilizer, pesticides, herbicides or the like) at the injection port 910 (e.g., by the injection pump 908). In one example, a mixer 911 is provided downstream from the injection port 910 for mixing the injection product with the carrier fluid (e.g., to form a mixed agricultural product) prior to delivery through the header 912 to the boom tubes 914. As further shown in FIG. 9A, a flow meter 924 and a pressure sensor 926 (e.g., a pressure transducer or the like) are coupled along the header 912 and configured to measure an actual overall flow rate and actual pressure (e.g., system pressure) of the agricultural product.

In other examples, the sprayer 900 includes a system that includes additives premixed with the carrier solution, and accordingly stored in the carrier reservoir 902. The injection reservoir 906, pump 908 and mixer are accordingly remove in this example. Optionally, the injection reservoir 906, the pump 908 and mixer are retained to facilitate the addition of other injection based additives to a premixed solution of the carrier fluid and base additives. Accordingly, the concentration of injection based additives into a premixed solution is regulated with the injection reservoir 906 and the injection pump 908.

Example smart nozzles 916 are shown in FIG. 9A. In the example shown, the smart nozzles 916 include one or more nozzle assemblies 918 (in this example a plurality) and control valves 920 associated with the one or more nozzle assemblies 918. As shown in FIG. 9A a boom section 922 distributes the agricultural product to each of the nozzle assemblies 918 from the control valve 920. As described herein an electronic control unit (ECU) of the smart nozzle 916 is coupled with the control valve 920 (or valves) of the smart nozzle 916 to according control the flow rate of the agricultural product through the nozzle assemblies 918 (e.g., according to a target smart nozzle flow rate, duty cycle, adjusted duty cycle or the like).

Figure 9B:
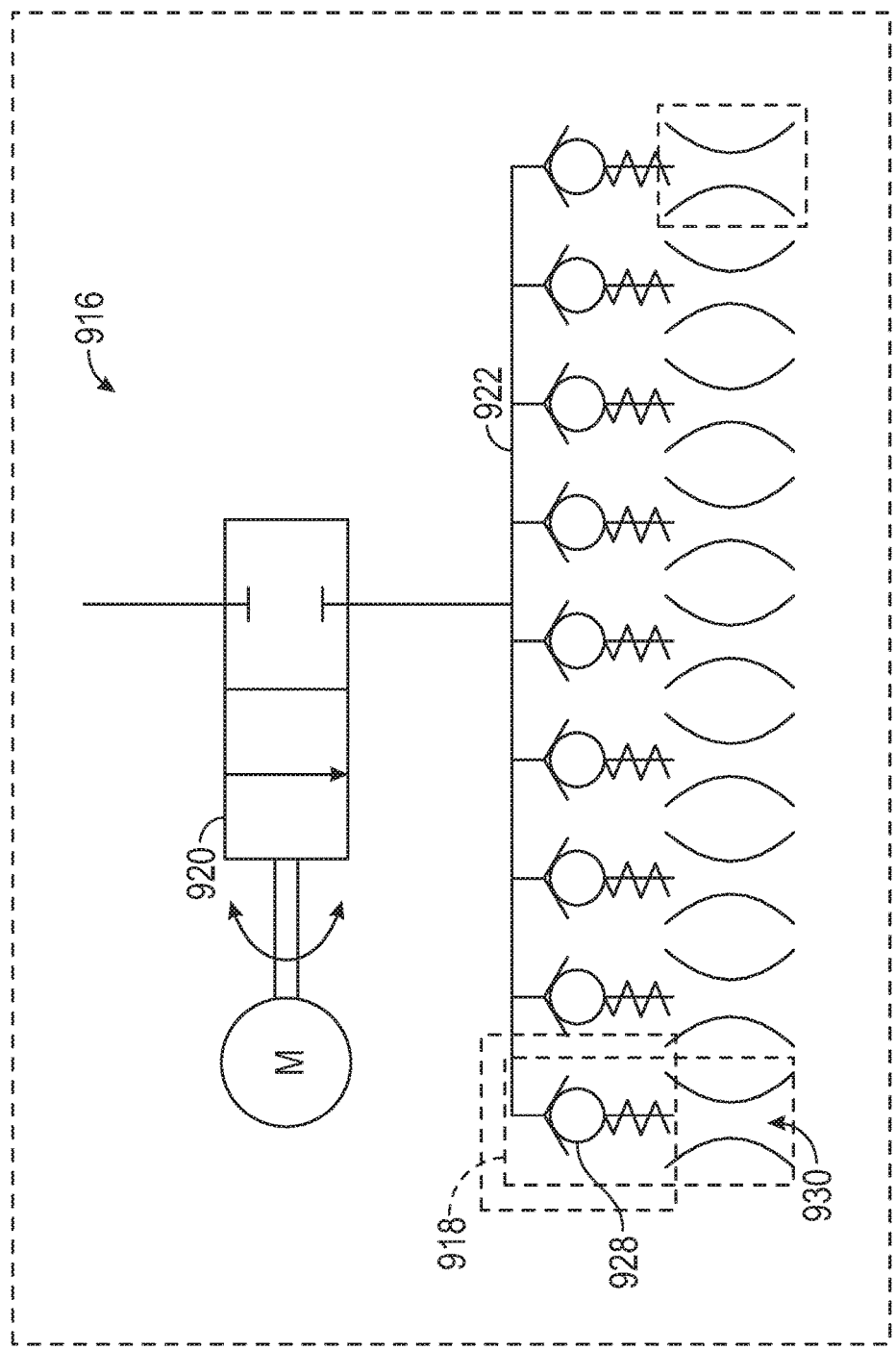
FIG. 9B is a schematic diagram of one example of a smart nozzle.

FIG. 9B is a detailed view of one of the example smart nozzle 916 shown in FIG. 9A. The smart nozzle 916 shown includes a plurality of nozzle assemblies 918 (in this example a plurality). Each of the nozzle assemblies includes a nozzle body 930 including one or more of a nozzle housing, nozzle tip, nozzle barrel including a plurality of nozzle tips or the like. The nozzle body optionally includes a check valve 928 to prevent the ingress of contaminants, air or the like into the smart nozzle 916.

The control valve 920 is coupled (e.g., communicatively coupled) with an ECU. The ECU, as described herein, controls the operation of the control valve 920 and accordingly regulates the flow rate of the agricultural product to the nozzle assemblies 918 associated with the smart nozzle 916. Optionally, the control valve 920 is associated with fewer nozzle assemblies 918, such as one, two, three, and so on nozzle assemblies 918 to provide enhanced resolution and corresponding finer control of the application of the agricultural product.

Figure 10A:
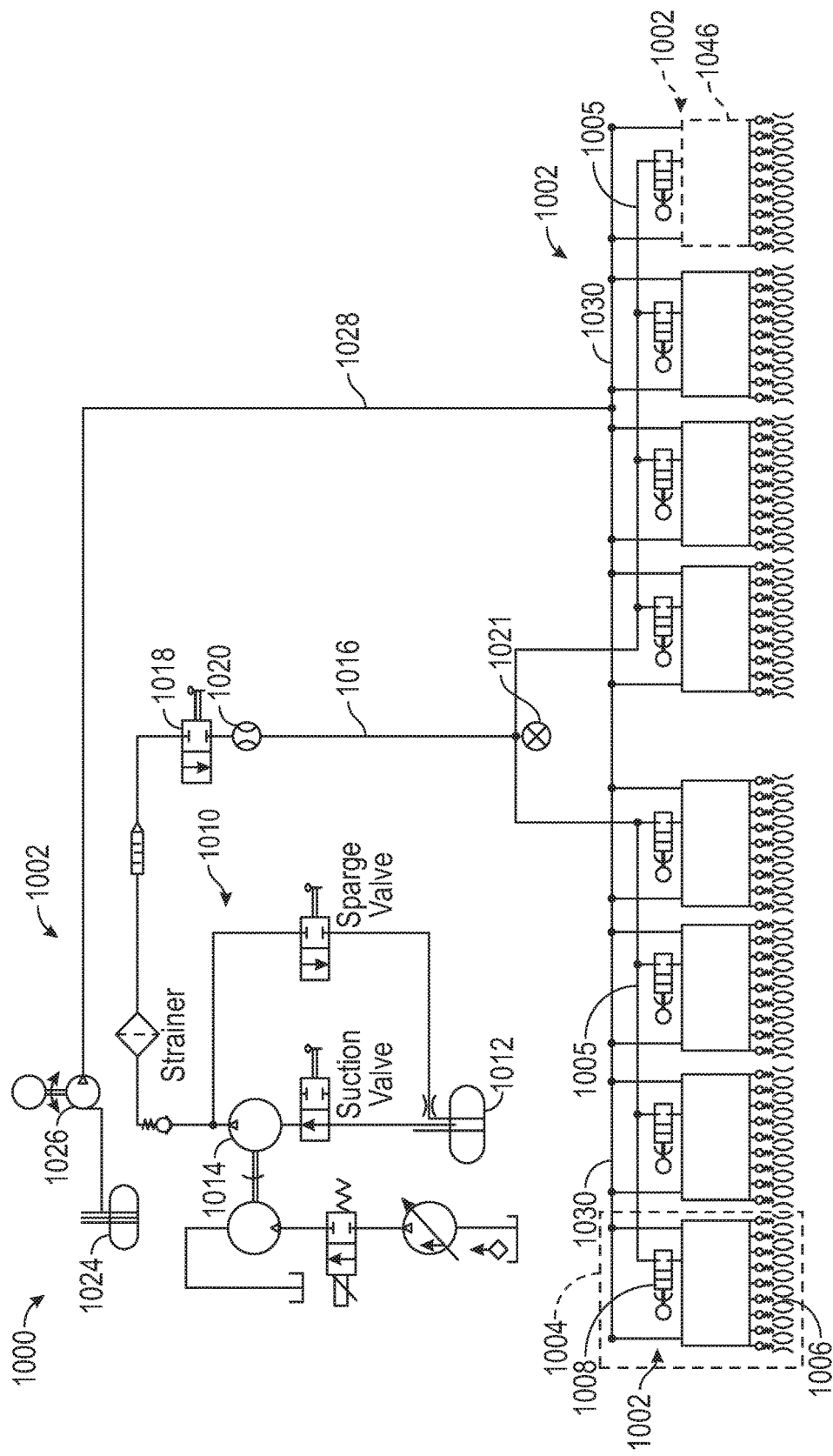
FIG. 10A is a schematic diagram of another example of an agricultural sprayer.

FIG. 10A shows a detailed example of a sprayer 1000 including a localized product injection system 1002 configured for use with the nozzle control systems described herein. In the example shown in FIG. 10A the localized product injection system 1002 is in a boom section format configured to inject one or more injection products (e.g., additives for an agricultural product) into the carrier fluid immediately upstream from nozzle assemblies. The smart nozzles 1004 (each including at least one control valve 1008 and one or more nozzle assemblies 1006) of the sprayer 1000 are coupled along sprayer booms and boom tubes 1005 shown in FIG. 10A.

A carrier system 1010 is shown in FIG. 10A and includes the carrier reservoir 1012. As shown in FIG. 10A the carrier reservoir 1012 communicates with the product pump 1014 that pressurizes the carrier fluid and delivers it within the header 1016. In one example the carrier system 1010 includes a carrier flow control valve 1018 and a flow meter 1020. The flow meter 1020 is coupled with a controller, such as the master node described herein, and measures the actual overall flow rate of the agricultural product (e.g., the carrier fluid) from the carrier reservoir 1012. Optionally, a pressure sensor 1021, such as a pressure transducer is provided with the carrier system, for instance along the header 1016. The pressure sensor 1021 is configured to measure the pressure of the carrier fluid (e.g., the actual pressure of the agricultural product). As further shown in FIG. 10A the header 1016 extends to the boom tubes 1005 extending to the left and right of the header 1016. Each of the boom tubes 1005 in turn feeds into a plurality of smart nozzles 1004. The control valves 1008 of the respective smart nozzles 1004 control the flow of the carrier fluid to each of the associated nozzle assemblies 1006. In other examples, the smart nozzles 1004 include supplemental control valves 1008 associated with the injection system 1002 that similarly control the flow of injection product to the carrier fluid passing through each smart nozzle 1004. In such an example, the smart nozzles 1004 are configured for control of the flow rate of the agricultural product (e.g., the carrier fluid and injection products) as well as the concentration of the injection product in the agricultural product.

Referring again to FIG. 10A, the localized product injection system 1002 includes an injection product reservoir 1024 and an injection pump 1026. The injection pump 1026 delivers the injection fluid (e.g., an agricultural product including one or more additives for the carrier fluid) from the reservoir 1024 to an injection header 1028. The injection header 1028 delivers the injection product to one or more injection boom tubes 1030 extending to the left and right as shown in FIG. 10A. The injection boom tubes 1030 distribute the injection product to the smart nozzles 1004. As previously described, the smart nozzles 1004 in the example shown in FIG. 10A deliver the injection product directly to each of the nozzle assemblies 1006 associated with a particular smart nozzle 1004 (e.g., one or more nozzle assemblies supplied from the corresponding control valve 1008).

As shown in FIG. 10E the localized product injection system 1002 is isolated from the carrier system 1010 until localized introduction of the injection product at the smart nozzles 1004 (e.g., adjacent to the nozzle assemblies 1006). Accordingly, the localized product injection system 1002 is able to maintain a pressurized environment for the injection product to the smart nozzles 1004 (e.g., with the injection pump 1026). At the smart nozzles the pressurized injection product is delivered to each of the nozzle assemblies 1006 as determined, for instance, by a controller module configured to inject a specified quantity of the injection product to the carrier fluid. Even in low flow situations with a low flow of carrier fluid the injection product is provided in a pressurized manner and is thereby ready for instantaneous delivery to one or more of the nozzle assemblies 1006. Accordingly, individualized and instantaneous control of the injection product (e.g., the concentration of the injection product) is achieved for each of the smart nozzles 1004. The injection product is provided at the smart nozzles 1004 (e.g., locally) and remote from the upstream carrier reservoir 1012.

Figure 10B:
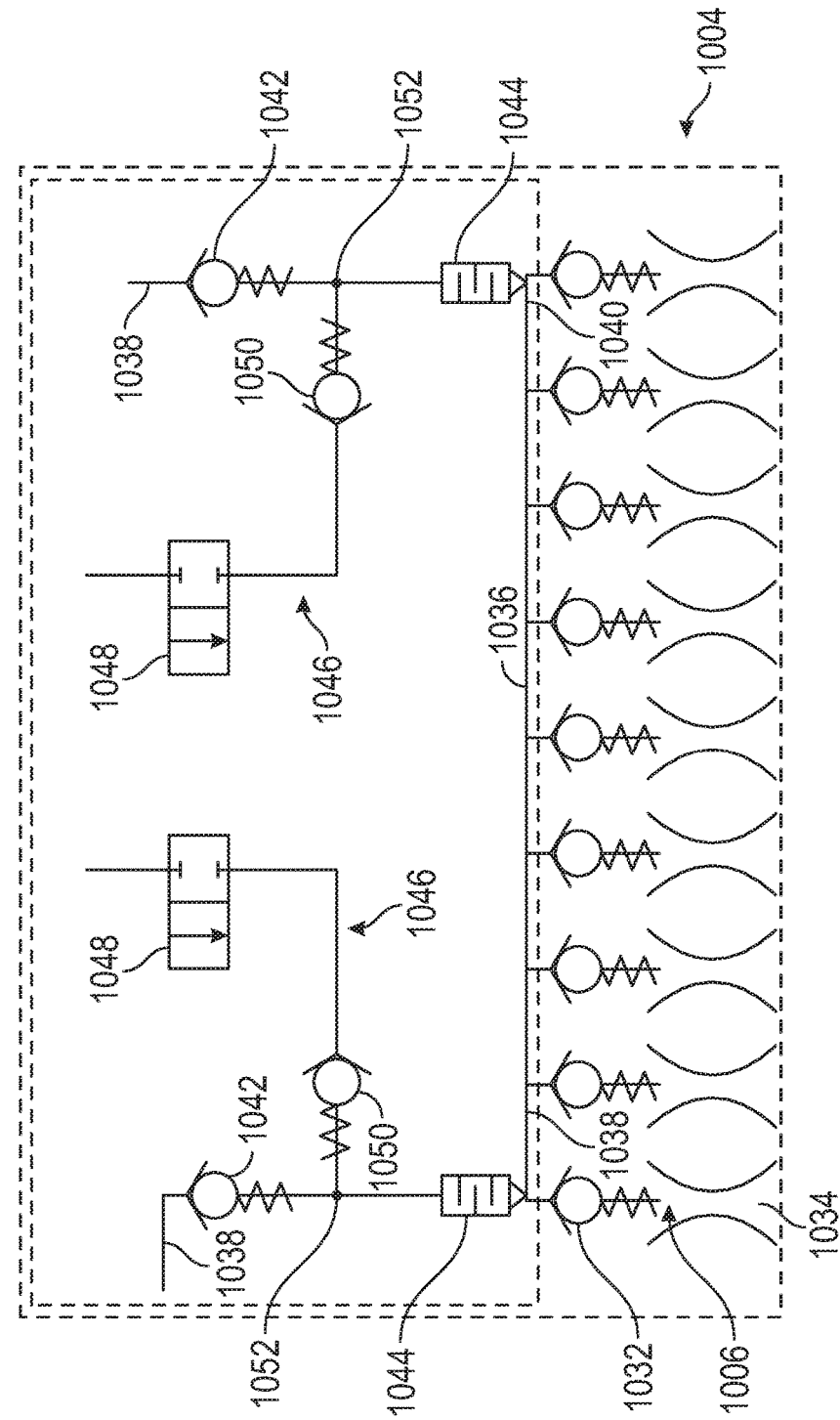
FIG. 10B is a schematic diagram of one example of a portion of a smart nozzle.

Referring now to FIG. 10B, a detailed view of one of the smart nozzles 1004 shown in FIG. 10A is provided. In this example, the smart nozzle 1004 optionally includes localized injection of an injection product to a flow of carrier fluid. The smart nozzle 1004, in this example, extends from left to right on the page and includes a plurality of nozzle assemblies 1006. In one example, the nozzle assemblies 1006 each include a nozzle body 1034 and a nozzle check valve 1032 (optionally part of the nozzle body). The nozzle body 1034 includes one or more of a nozzle housing, nozzle tip, nozzle barrel including a plurality of nozzle tips or the like. As with other examples herein, the nozzle body 1034 includes one or more nozzle tips including, but not limited to, an atomizer nozzle, stream nozzle or the like. In the example shown in FIG. 10B nine nozzle assemblies 1006 are provided in a spaced configuration along a boom section 1036 of the smart nozzle 1004. Carrier lines 1038 introduce carrier fluid (e.g., an agricultural product) to each of boom section 1036 ends 1038, 1040. In one example each of the carrier lines 1038 includes a check valve 1042 and a mixer 1044, such as a static mixer. The control valve 1008 of the smart nozzle 1004 (shown in FIG. 10A) is provided upstream relative to the check valves 1042 along the carrier lines 1038.

The localized product injection system 1002 shown in FIG. 109 includes the smart nozzle 1004 one or more smart nozzles, such as the smart nozzle shown). In the example shown in FIG. 10B, the injection interfaces 1046 is associated with each of the carrier lines 1038 (the carrier lines extending from the boom tube 1030 of the carrier system 1010 to the boom section 1036). Each of the injection interfaces 1046 delivers injection product to the associated carrier line 1038 in communication with the boom section first and second ends 1038, 1040.

In one example, the injection interfaces 1046 include interface valves 1048 in series with check valves 1050. In one example the interface valves 1048 include pulse width modulation valves or other control valves configured to provide a metered flow of the pressurized injection product through the injection interfaces 1046 to injection ports 1052 in communication with each of the carrier lines 1038. In one example, the actuation of the interface valves 1048, for instance to a desired flow rate, delivers the corresponding quantity of injection product to each of the corresponding carrier lines 1038 at the injection ports 1052 to achieve a corresponding concentration of the injection product in the carrier fluid. The solution of the carrier fluid and the injection product (e.g., the agricultural product) is delivered through the mixers 1044 and mixed prior to delivery to the boom section 1036. The mixed solution of the carrier fluid and the injection product (the agricultural product) is thereafter delivered from the boom section first and second ends 1038, 1040 throughout the boom section 1036 and to each of the nozzle assemblies 1006 of the smart nozzle 1004. Accordingly, each of the nozzle assemblies 1006 associated with a particular smart nozzle 1004, in this example, delivers substantially the same agricultural product having the same injection product concentration. The injection interfaces 1046 associated with the boom section 1036 are operated independently relative to other injection interfaces 1046 associated with other boom sections 1036 and smart nozzles 1004 of the sprayer 1000. Accordingly, individualized control and instantaneous delivery of the injection product to each of the boom sections 1036 is achieved for each of the boom sections 1036 in this example. This precise and individual control is married with the other features of the smart nozzle 1004 to facilitate high resolution control of both the injection product and the carrier fluid (e.g., according to the nozzle control systems described herein) based on one or more sprayer characteristics including, but not limited to, boom width; target product coverage per unit area; sprayer speed; sprayer yaw rate; nozzle characteristics such as nozzle location along the boom, nozzle spacing, flow coefficients of the nozzles or the like. The localized injection interfaces 1046 cooperate with control of the nozzles to enhance the controlled distribution of the agricultural product by allowing for instantaneous (including near instantaneous) control of the concentration of one or more injection products (additives) of the agricultural product along with the controlled flow of the agricultural product (e.g., at a target smart nozzle flow rate adjusted for an error correction as described herein).

Figure 11A:
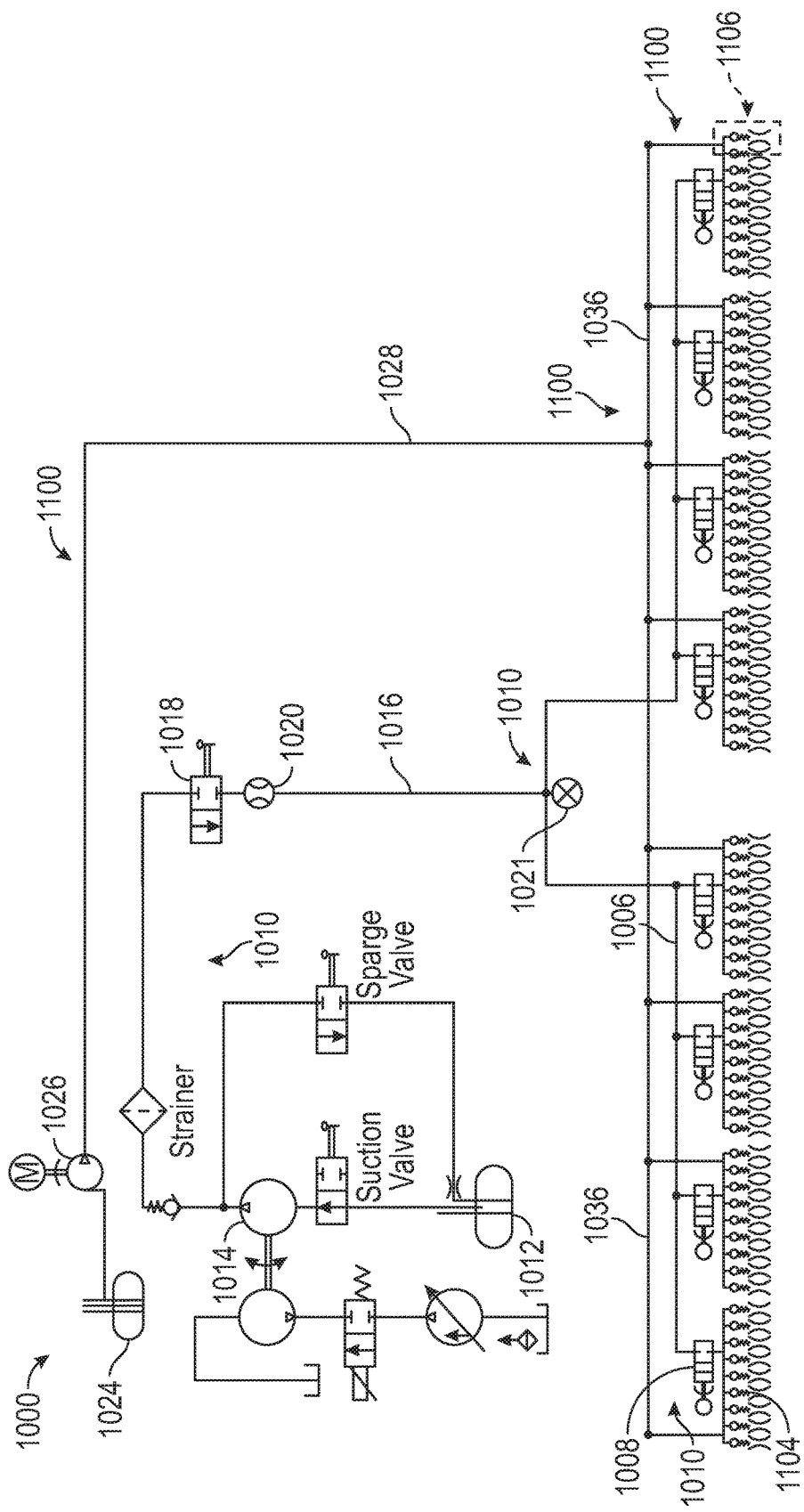
FIG. 11A is a schematic diagram of yet another example of an agricultural sprayer.

FIG. 11A shows another example of the sprayer 1000. The example shown in FIG. 11A is similar in at least some regards to the sprayer 1000 previously shown and described in FIGS. 10A and 10B. For instance, the sprayer 1000 shown in FIGS. 11A and 11B includes a localized product injection system 1100 that is separate from the corresponding carrier system 1010. As previously described herein, the localized product injection system 1100 delivers an injection product from the injection product reservoir 1024 to a plurality of boom sections 1036. As shown in FIG. 11A and further shown in FIG. 11B, the injection interfaces 1106 are each in communication with corresponding smart nozzles 1102 each having an associated nozzle assembly 1104 and control valve 1008. Stated another way, the smart nozzles 1102 shown in FIGS. 11A and 11B each include a single associated nozzle assembly 1104 and associated injection interface 1106 (shown in detail in FIG. 11B). Each smart nozzle 1102 optionally uses a single control valve 1008 (as previously described with FIGS. 10A, B) or optionally associates a separate control valve 1008 with each of the nozzle assemblies 1104. FIG. 11A shows one separate control valve 1008 associated with an array of nozzle assemblies 1104 for ease of illustration. The single control valve 1008 shown in FIG. 11A is in some examples a plurality of control valves 1008 each associated with one or more of the nozzle assemblies 1104 to accordingly provide increased resolution of carrier fluid (agricultural product) control.

Each of the injection interfaces 1106, for instance along the length of the sprayer booms 4 (see FIG. 1), are independently controlled according to specified concentrations of the injection product within the carrier fluid. The dispensed agricultural product from each of the nozzle assemblies 1104 of the smart nozzles 1102 thereby has a varying concentration of the injection product based on the independent control of the concentration provided by the injection interfaces 1106. The control of the injection concentration is, as discussed previously herein, married with the nozzle flow rate control systems to provide concentration control of one or more additives (injection products) along with high resolution control of a nozzle flow rate (e.g., determination of a target smart nozzle flow rate based on one or more sprayer characteristics and adjust of the same with an error correction).

Figure 11B:
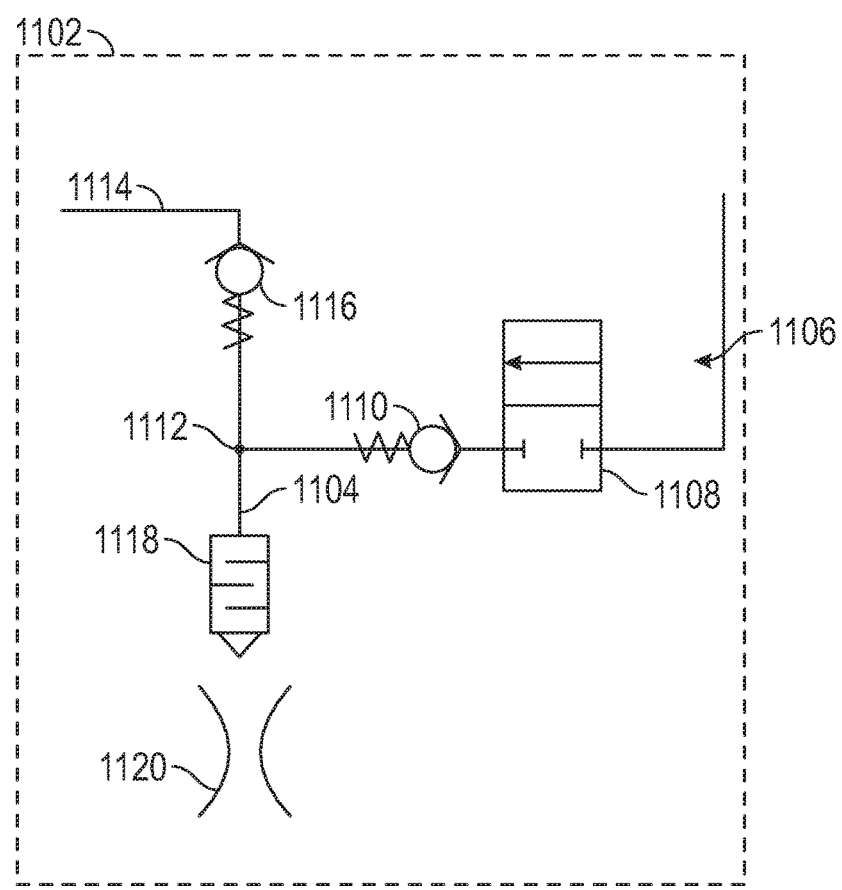
FIG. 11B is a schematic diagram of another example of a portion of a smart nozzle.

Referring now to FIG. 11B, another example of the injection interface 1106 is shown in detail. For instance, as shown in FIG. 11B the injection interface 1106 includes an interface valve 1108 and a check valve 1110 similar in at least some regards to the interface valve and check valves previously described and shown in FIG. 10B. In contrast to the previously described example, the injection interface 1106 includes an injection port 1112 provided at the nozzle assembly 1104 and downstream from a carrier line 1114 communicating with the boom section 1036 or boom tube 1005. The control valve 1008 of the smart nozzle 1102 is upstream relative to the injection port 1112. The nozzle assembly 1104 includes a check valve 1116 and an in-line mixer 1118 (e.g., a static mixer). The nozzle assembly 1104 further includes a nozzle body 1120, having a nozzle housing, one or more nozzle tips or the like (e.g., such as an atomizer or stream nozzle) in communication with the mixer 1118. As shown in FIG. 11B, the injection port 1112 is coupled with the nozzle assembly 1104. For instance the injection port 1112 is interposed between the check valve 1116 and the mixer 1118.

In operation, the carrier fluid is metered by the smart nozzle 1102 at a target smart nozzle flow rate as described herein, for instance, according to one or more static or changing sprayer characteristics that may vary for each smart nozzle and an error correction based on a comparison of the expected overall flow rate and an actual overall flow rate of the agricultural product. The injection product is then delivered through the injection boom tubes 1030 to each of the injection interfaces 1106. The interface valve 1108 meters the amount of injection product delivered to the corresponding nozzle assembly 1104. For instance, the injection product is independently metered for each of the injection interfaces 1106 according to control signals from a controller associated with each of the injection interfaces 1106. The controller (e.g., the master node described herein or another control module) is configured to control each of the injection interfaces 1106 independently or in one or more groups or arrays. The injection product is delivered from the interface valve 1108 through the check valve 1110 and into the nozzle assembly 1104 through the injection port 1112. Prior to delivery through the nozzle body 1120 include a nozzle tip the injection product in combination with the carrier fluid is optionally mixed within the mixer 1118 and thereafter delivered through the nozzle body 1120 as the agricultural product having the specified concentration of the injection product and distributed according to a duty cycle based on the determined target smart nozzle flow rate and an error correction.

In a similar manner to the localized product injection system 1100 shown in FIGS. 10A and 10B the localized product injection system 1100 shown in FIGS. 11A and 11B is configured to provide an instantaneous addition of an injection product to the carrier fluid stream, provided at the target smart nozzle flow rate, immediately prior to its dispensing through the nozzle body 1120 (e.g., local to the nozzle assembly 1104). Accordingly, instantaneous changes in concentration of the injection product in an agricultural product, for instance for differing parts of a field, are achieved on an instantaneous (including near instantaneous relative to upstream mixing) as-needed basis as the sprayer 1000 moves through the field.

Figure 12:
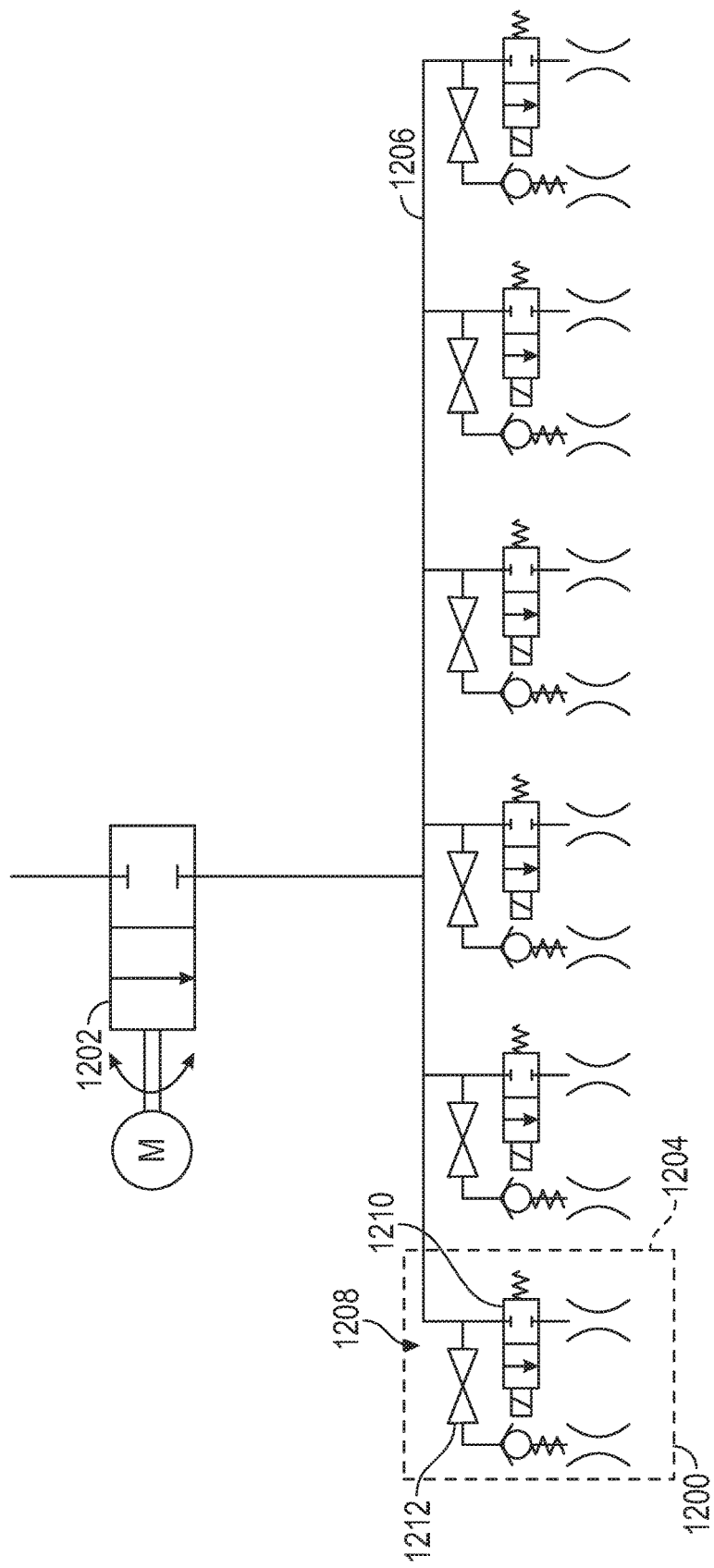
FIG. 12 is a schematic diagram of one example of a stacked nozzle assembly.

FIG. 12 shows one example of a plurality of smart nozzles 1200, for instance, used with one or more of the sprayers such as the sprayers 900, 1000 shown in FIGS. 9A-11B as previously described herein. In the example shown in FIG. 12, the smart nozzle 1200 includes a stacked or composite nozzle assembly 1204 including, for instance, component nozzles that provide variation in flow configurations with the smart nozzle 1200 in one or more of high and low flow modes. The plurality of smart nozzles 1200 are shown, in one example, coupled along a boom section 1206, for instance, a boom section of one or more of the sprayers 900, 1000. In this example, six smart nozzles 1200 are provided along the boom section 1206. In other examples, the boom section 1206 includes one or more smart nozzles 1200 provided there along. As further shown in FIG. 12, an optional boom control valve 1202, for instance, another control valve similar to the control valve 1210 used in the smart nozzles 1200, is provided upstream from the boom section 1206 to control the flow of the carrier fluid or mixture of carrier fluid and additive (e.g., both considered the agricultural product) into the boom section 1206 and to the smart nozzles 1200.

Referring again to FIG. 12, the smart nozzle 1200, in this example, includes a stacked nozzle assembly 1204 including component nozzles. In another example the stacked nozzle assembly 1204 includes a unitary nozzle fed from dual valves (shown in FIG. 12). In the example shown, the smart nozzle 1200 includes a variable rate control valve 1210, for instance, controlled to operate with a range of flow rates (off, on and open with corresponding flow rates therebetween) according to variation in orifice size, duty cycle of a valve operator or the like. In an example, the variable rate control valve includes an oscillating valve operator configured to oscillate between open and closed configurations according to a variable duty cycle. The variable duty cycle corresponds to varying timing of the open and closed configurations (e.g., 70 percent on and 30 percent off during a 10 second period). The smart nozzle 1200 further includes a bimodal control valve 1212 operating in parallel to the variable rate control valve 1210. The bimodal control valve includes off and on configurations corresponding to fully closed and fully open.

In the example shown, the stacked nozzle assembly 1204 includes a composite nozzle body 1208 having first and second dual nozzle tips in communication with a respective one of the bimodal control valve 1212 or the variable rate control valve 1210. In other examples, the stacked nozzle assembly 1204 includes a nozzle body having first and second component nozzle bodies corresponding to the valves 1210, 1212 and their corresponding nozzle tips.

In another example, and as previously described herein, each of the variable rate control valve 1210 and the bimodal control valve 1212 are in communication with a single nozzle tip, for instance, a unitary nozzle tip in communication with both of the valves.

The stacked nozzle assembly 1204 and the corresponding smart nozzle 1200 including the stacked nozzle assembly are operable in a number of configurations according to the operation of the sprayer (e.g., at high or low travel speeds, high or low flow rates, specified droplet size, continuous coverage or the like). For instance, in one configuration each of the bimodal and variable rate control valves 1212, 1210 are operated in a fully opened mode (e.g., a first bypass mode) to facilitate the delivery of the carrier fluid or carrier fluid mixed with the injection product (e.g., both being the agricultural product) through each of the valves 1210, 1212 according to, for instance, the operation of another valve such as the boom control valve 1202. In one example, the boom control valve 1202 is operated in a variable fashion, for instance, across a range of flow rates, for instance, pursuant to control from a master node or other electronic control unit (associated with a smart valve as described herein) to thereby deliver a specified flow rate through each of the fully opened variable rate control valve 1210 and bimodal control valve 1212 of the smart nozzle 1200. Optionally, control of the agricultural product flow rate is provided by one or more product output features, such as a pump, control valve coupled along a header or the like.

In another example, one of the variable rate control valve 1210 or the bimodal control valve 1212 is closed while the other remains open (e.g., a second bypass mode). In this example, the boom control valve 1202, a pump or upstream control valve controls the variable flow rate of the carrier fluid or carrier fluid in combination with an additive such as an injection product into the opened one of the valves 1210, 1212. In this example, the overall flow rate through the stacked nozzle assembly 1204 is less than that otherwise provided in the previously described (first) bypass mode with each of the variable rate and bimodal control valves 1210, 1212 in open configurations. In this example (with one of the valves 1210, 1212 closed), a lower flow rate is provided into the boom section 1206, for instance, by way of the control valve 1202, for instance, while the sprayer such as the sprayer 900, 1000 is moved, for instance, at a slower speed relative to the fully opened (first) bypass mode previously described with both of the valves 1210, 1212 open.

Figure 13:
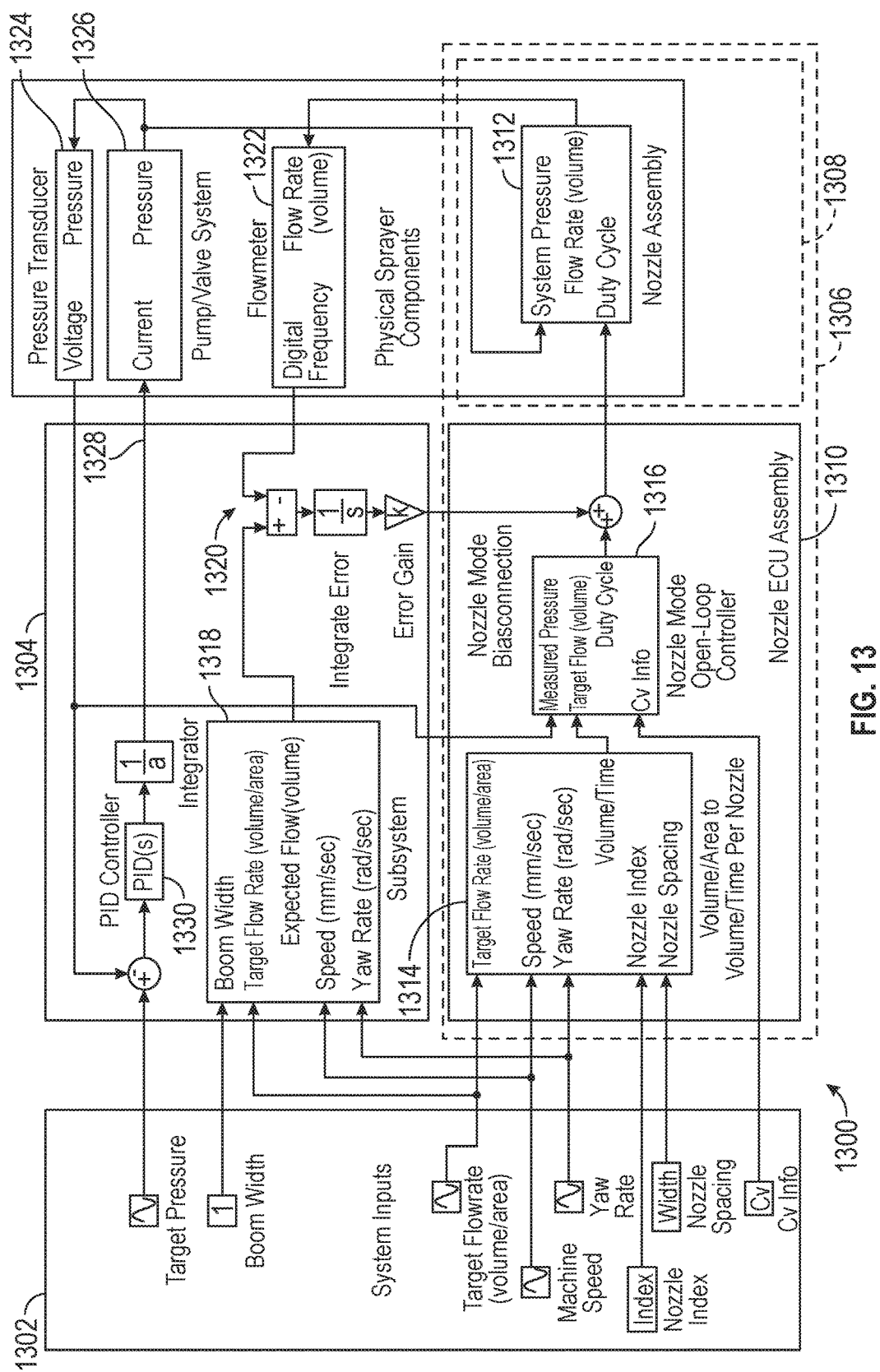
FIG. 13 illustrates a general overview of a nozzle control system according to an example of the present subject matter.
Figure 14:
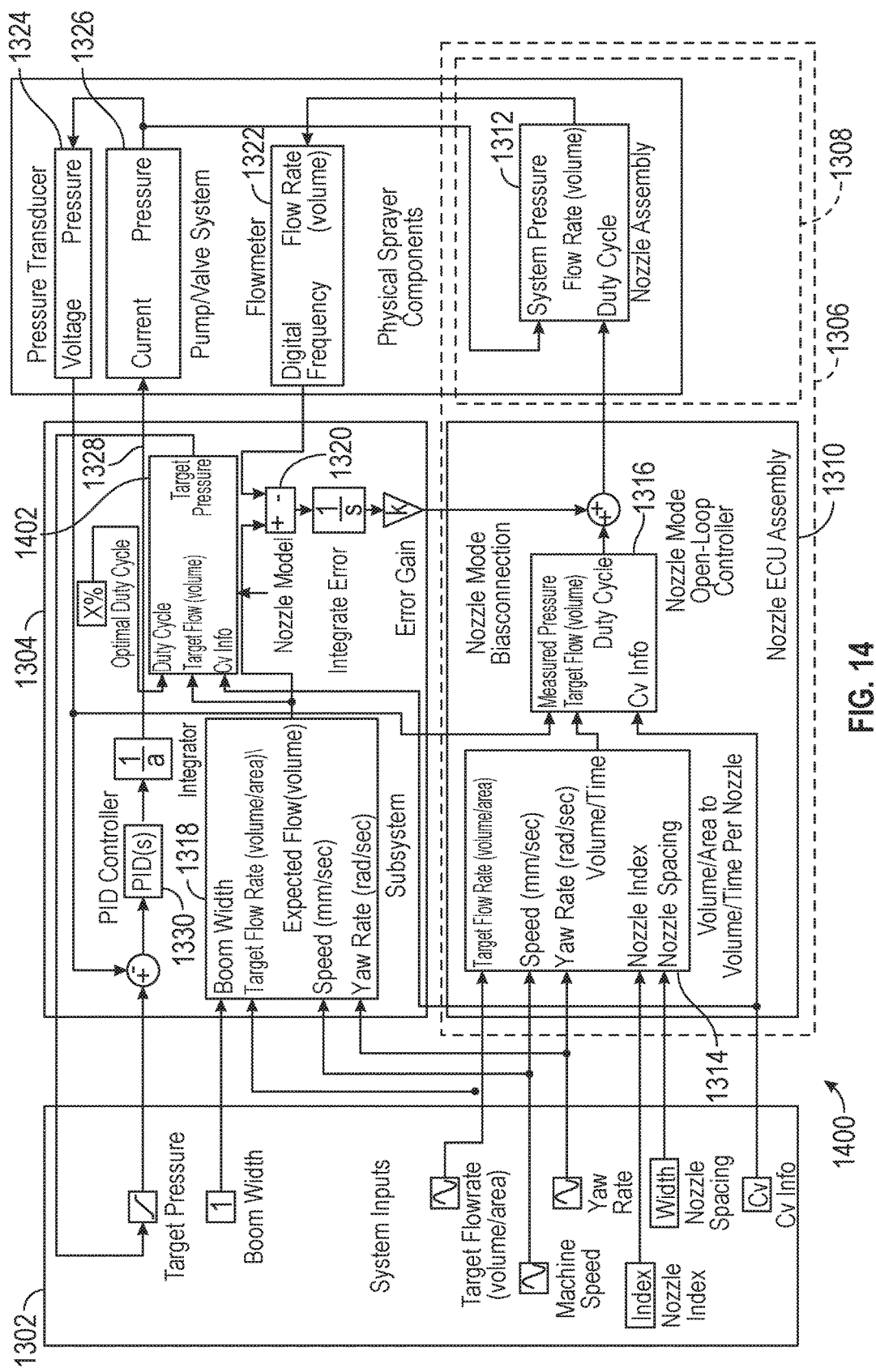
FIG. 14 illustrates a general overview of a nozzle control system configured to operate in a variable pressure (VP) mode of operation according to an example of the present subject matter.

Optionally, in the first or second bypass modes described herein, the boom control valve 1202 is operated according to a target smart nozzle flow rate in a manner consistent, for instance, with the systems and methods shown in FIGS. 13 and 14 and described herein. For instance, the target smart nozzle flow rate is provided to the boom control valve 1202 by an associated electronic control unit (ECU) to actuate the valve operator and provide the targeted smart nozzle flow rate through each of the stacked nozzle assemblies 1204. In such a configuration, the boom control valve 1202 and each of the stacked nozzle assemblies 1204 along the associated boom section 1206 are a composite smart nozzle.

Referring again to FIG. 12, the stacked nozzle assemblies 1204 as part of the smart nozzles 1200 are, in other examples, operated according to variable flow control configuration with each of the variable rate control valves 1210 of the associated smart nozzles 1200 operated according to, for instance, target smart nozzle flow rates determined by the electronic control units (ECU) associated with each of the respective smart nozzles 1200. In one example, where the target smart nozzle flow rate is below a maximum flow rate of the variable rate control valve 1210, the variable rate control valve 1210 is operated by itself, for instance, with the bimodal control valve 1212 in a closed configuration. The electronic control unit operates the variable rate control valve 1210 at a duty cycle (for instance, oscillating open and closed configurations that vary between 0 and 100 percent each based on the duty cycle). The duty cycle generated by the ECU is used by the variable rate control valve 1210 to achieve a target smart nozzle flow rate of the agricultural product at the stacked nozzle assembly 1204 (e.g., a spray of the product through the nozzle tip associated with the smart nozzle 1200).

As will be described herein, in one example the smart nozzle 1200 is operated in a low flow configuration (at least one low flow mode), for instance, with the variable rate control valve 1210 selectively opened according to the target smart nozzle flow rate and the bimodal valve 1212 is closed. The variable rate control valve 1210 of the smart nozzle 1200 implements flow control of the agricultural product according to the target smart nozzle flow rate for the nozzle smart 1200 determined by the associated ECU. The entirety of the agricultural product is directed through the variable rate control valve 1210 while the bimodal valve 1212 is closed.

In another example, the stacked nozzle assembly 1204 as part of one or more smart nozzles 1200 is, in another example, operated in a high flow configuration (at least one high flow mode). In a high flow configuration, for instance with a target smart nozzle flow rate greater than the maximum flow rate of the variable rate control valve 1210, the bimodal control valve 1212 is open, for instance, to an on or open configuration to facilitate the delivery of the agricultural product through each of the bimodal control valve 1212 (at a baseline flow rate) and the variable rate control valve 1210 (at a controlled variable flow rate). In contrast to the baseline flow rate of the bimodal control valve 1212, the variable rate control valve 1210 provides varied flow rates of the agricultural product through the smart nozzle 1200. The resulting spray of agricultural product from the smart nozzle (in the high flow configuration) is a composite of the baseline flow from the bimodal control valve 1212 and a variable flow from the variable rate control valve 1210 When summed the component flow rates are equal to the target smart nozzle flow rate determined by the ECU. Accordingly, where a target smart nozzle flow rate is greater than the maximum flow rate of the variable rate control valve 1210 and its associated nozzle tip the bimodal control valve 1212 provides a static base flow of the agricultural product and the variable rate control valve 1210 operates below its maximum flow rate to accordingly control the composite flow rate according to the determined target smart nozzle flow rate otherwise greater than the maximum flow rate of the variable rate control valve 1210.

The smart nozzle 1200 (as well as the other smart nozzle configurations herein) is configured to provide a target smart nozzle flow rate of the agricultural product through the smart nozzle 1200 according to one or more sprayer characteristics including, but not limited to, the sprayer speed, the sprayer yaw rate, nozzle index identification (nozzle number and location along a boom), boom width, nozzle spacing, one or more nozzle characteristics including flow coefficients of each of the associated nozzles of the stacked nozzle assembly 1204 (or unitary nozzles), flow coefficients through the various valves, tubing or the like. Additionally, the smart nozzle 1200 including bimodal and variable rate control valves 1212, 1210s described herein is configurable into a number of configurations or modes including, but not limited to, bypass modes (e.g., with the stacked nozzle assembly 1204), high and low flow modes and, as described herein below, other modes of operation of the sprayer 900, 1000 including static and variable pressure configurations.

FIG. 13 illustrates a general overview of a nozzle control system according to an example of the present subject matter. In certain examples, the nozzle control system can control application of agricultural products—such as liquid fertilizer—along the length of a boom.

In certain examples, the nozzle control system can include a pump (and/or a valve) coupled to a storage tank or reservoir and a number of independent "smart" nozzles 1306 spaced along a boom for delivering the liquid product. Each of the smart nozzles includes one or more control valves operated under the control of an electronic control unit or ECU. In certain examples, the ECUs can be daisy-chained together and connected to a main controller or master node via an ISO CAN bus. The master node 1304 is further connected to a user interface or field computer, such as the input interface 1302.

The master node 1304 can handle a number of functions in the system including, but not limited to, communicating with the pump and a pressure sensor in order to regulate pressure in the system to a desired target pressure (including pressure ranges as shown in FIG. 14), communicating with a flow sensor to obtain an actual overall flow rate, calculating an overall expected flow rate, comparing the expected flow rate to the actual flow rate from the flow sensor to generate an error correction for the smart nozzles as discussed further below, or combinations thereof.

To calculate the overall expected flow rate, the master node can first calculate a flow rate for each smart nozzle (e.g., based on vehicle speed, yaw rate, the location of the nozzle on the boom and the target volume per area). The master node can then sum the flow rates and compare this sum to the actual overall system flow rate from the flow sensor to determine an error correction. The error correction can then be provided on the CAN bus for the smart nozzles to change their flow rate. In certain examples, the master node does not use flow rates or other data from the smart nozzles in making the error percentage calculation, instead, the master node 1304 independently generates the expected overall flow rate based on one or more sprayer characteristics including the specified product coverage (e.g., in units of volume per unit area), machine speed, yaw rate or the like.

The error correction can be a single value or error percentage that is communicated globally to all of the smart nozzle ECUs 1310. In some examples, the error correction is not individualized to each smart nozzle; rather all of the smart nozzle ECU's receive the same error percentage value. Consequently, if the flow meter registers an actual flow rate greater than the expected overall flow rate, then a negative error percentage will be sent out, reducing each smart nozzle's self-calculated output (e.g., target smart nozzle flow rate) by the same percent. Conversely, if the flow meter registers a flow rate less than the expected overall flow rate, then a positive error percent will be sent out, increasing each nozzle's self-calculated output (target smart nozzle flow rate) by the same percent.

In certain examples, the master node 1304 can also check for saturation points in the flow range for the nozzles to make the percent error more accurate. For example, if the master node calculates a flow rate for a nozzle that exceeds the nozzles maximum flow rate, then the master node can use the maximum nozzle flow rate rather than the calculated nozzle flow rate when summing the rates to determine an overall flow rate. The master node does not control the flow rates of the nozzles themselves.

In certain examples, each smart nozzle 1306 independently calculates and control its own flow rate with the associated ECU 1310. Each smart nozzle can calculate its flow rate based on a target flow rate (specified product coverage), vehicle speed, yaw rate and the location of the nozzle on the boom (determined by nozzle spacing and nozzle index). Each smart nozzle 1306 can perform its own flow rate calculation independent from the other nozzles. In particular, the CAN bus can transmit one or more of vehicle speed, yaw rate, boom width, location of each nozzle on the boom, target volume per area for the applied product, and the error correction to the ECU 1310 of each smart nozzle 1306. Using this data provided on the CAN bus, each smart nozzle 1306 can determine its own flow rate, adjusted for the error correction determined by the master node 1304.

In determining a nozzle flow rate, each of the smart nozzles can receive, as inputs, speed, yaw rate, target flow rate (volume/area), nozzle spacing and nozzle index, and can use these inputs to determine a target flow rate that is specific to the individual nozzle. All of these inputs—save the nozzle index input—can be dimensional inputs rather than unitless values, proportional to one another for a particular condition. In addition, the nozzle indexes—while unitless—can provide coefficients for nozzle spacing and may not be proportional to one another for a particular condition.

In certain examples, the nozzle control system can include or apply logic (such as if-then statements) to determine whether a nozzle should be on or off. For example, if there is an error or the master switch is off, the target rate may not be applied to the nozzle and the nozzle may be shut off. To the extent if-then logic could be considered multiplication by a one or zero, the ones or zeros do not represent unitless, values proportional one another for a particular condition such as target flow rate.

In certain examples, the nozzle control system may not divide a flow rate for an individual nozzle by an average of flow rates for all of the nozzles. In such examples, the nozzle control system can sum the flow rates and compares the sum to an actual measured flow rate to determine an error percentage. The error percentage is then used by individual nozzles to adjust their flow rates.

In addition to the above modes of operation, in certain examples, the nozzle control system can employ a variable pressure (VP) mode of operation. The VP mode of operation can be especially useful in applications where it is desirable to avoid gaps in coverage. As discussed above, duty cycle of a nozzle can be the adjustment parameter the nozzle ECU assembly uses to provide a desired nozzle flow rate or droplet size. For some materials that do not migrate after application, a lower duty cycle can result in gaps of coverage. In the VP mode, the duty cycle of the nozzle is operated at a target duty cycle and the user does not enter a target pressure, but instead a pressure range can be entered. The target pressure is automatically calculated in the background and is based off the target duty cycle for the nozzle control valve. In an example, the target duty cycle for the nozzle control valve can be set at approximately 70% (although this can be different) and may not be user settable. In certain examples, even though the target nozzle duty cycle is set, each nozzle will continue to run their existing control algorithm to achieve the desired flow rate thus the actual duty cycle may vary from the target duty cycle. In this mode however, the pressure control algorithm attempts to calculate and provide a system pressure that can provide the flow rate using the target duty cycle at the nozzles. In certain situations, such as planters and fertilizer applicators, a VP mode of operation can reduce or eliminate duty cycle related coverage gaps. Generally, a VP mode of operation can allow for a larger speed range of operation. A larger speed range can be beneficial in applications where maximum speed is a priority during the application.

In certain applications, each nozzle location on a boom (each nozzle assembly) can include a stacked nozzle assembly that can include multiple nozzle bodies. In general, only one of the nozzle bodies is employed with a nozzle control valve operable as discussed above. Such applications can provide a very large speed range including low speeds, where only one of the nozzle bodies is providing material application, to high speeds, where each of the other nozzle bodies are full "on" and the nozzle control valve provides fine control of the material application. Fertilizer spray applications are examples where this mode can provide benefit.

FIG. 13 shows one example of a nozzle flow rate control system 1300 (herein the control system 1300 or system 1300) configured for operation in a set point pressure mode. The system 1300 pressurizes and maintains the pressure of the agricultural product at a set point or target pressure. Maintenance of a target pressure facilitates the generation of streams of the agricultural product (even at varying flow rates) with a corresponding droplet site (e.g., large droplets, small droplets, diffuse spray, concentrated spray or stream or the like).

As shown, the nozzle flow rate control system 1300 includes a series of components configured to provide individualized flow rates to a plurality of smart nozzles, such as the smart nozzle 1306 shown in FIG. 13. The smart nozzle 1306 shown schematically in FIG. 13 includes one or a plurality of smart nozzles 1306, for instance, coupled with one or more features of the control system 1300 including, but not limited to, the input interface 1302, the master node 1304 and one or more components of the system 1300 (e.g., a pressure sensor 1324, flow meter 1322 or the like). When describing the smart nozzle 1306 shown, for instance, in FIG. 13 as well as the smart nozzle shown in FIG. 14, reference is made to one or more of the previously described smart nozzles described and shown herein in FIGS. 9A-12. The smart nozzle 1306, for instance, includes a nozzle assembly, such as the nozzle assembly 1308 shown schematically in FIG. 13 having at least a variable rate control valve 1312 and at least one nozzle body as well as an electronic control unit 1310 (ECU) in communication with the control valve 1312. The control valve 1312 and the nozzle assembly 1308 described herein correspond to one or more of the associated control valves or nozzle assemblies described and shown in the description and figures herein including, for instance, the corresponding control valves and nozzle assemblies shown in FIGS. 9A-12.

The nozzle flow rate control system 1300 as described herein uses the smart nozzle electronic control units (ECU) 1310 to generate target smart nozzle flow rates at each of the smart nozzles 1306 that are used to operate variable rate control valves 1312 of the smart nozzles 1306 and generate a corresponding spray of the agricultural product at the target smart nozzle flow rate. The master node 1304 is used in combination with the ECUs of the smart nozzles 1306 to provide an error correction used by the ECUs to provide an adjustment to the target smart nozzle flow rate (e.g., corresponding to an adjusted duty cycle). In one example, the smart nozzle 1306 includes a plurality of nozzle assemblies 1308, for instance, spread along the boom of the sprayer and associated with a single ECU 1310. In another example, the smart nozzle 1306 includes a single nozzle assembly 1308 associated with a single ECU 1310.

As described herein, the ECU 1310 of each smart nozzles 1306 generates a smart nozzle flow rate for the respective smart nozzle. The target smart nozzle flow rate is converted, for instance, into a voltage, current, duty cycle or the like and used by the control valve 1312 to selectively open, close or operate the valve operator between the open and closed configurations (e.g., between a flow rate of zero and the maximum flow rate for the valve). In one example, the control valve 1312 includes an oscillating valve operator that is moved between on and off (open and closed) configurations according to a duty cycle corresponding to the target smart nozzle flow rate.

In parallel to each of the smart nozzles 1306, the master node 1304 senses the actual flow of the agricultural product within the sprayer, for instance, one or more of the sprayers 900, 1000 described herein and compares the actual flow rate with an expected overall flow rate of the agricultural product (generated with the master node 1304). The comparison of these values is used to determine an adjustment or error correction used by the smart nozzles 1306, for instance the ECUs 1310, to adjust the duty cycle (e.g., to an adjusted duty cycle) to compensate for a detected difference between the expected overall flow rate of the sprayer (e.g., a target overall flow rate) and the actual flow rate of the agricultural product of the sprayer.

Referring again to FIG. 13, the components of the nozzle flow rate control system 1300 include an input interface 1302. The input interface 1302 includes an input device such as, but not limited to, a keyboard, keypad, data port configured for connection with one or more of a field computer, network, wireless network, one or more sensors of the sprayer or associated vehicle or the like. The input interface 1302 is used, in one example, to provide one or more inputs to the nozzle flow rate control system 1300 to facilitate the control of the system 1300 to achieve one or more of an expected agricultural product coverage in a precise and reliable manner that is controlled based on one or more of the characteristics of the sprayer. As shown in FIG. 13, the input interface 1302 provides a plurality of example inputs including, but not limited to, one or more of a target pressure (including a pressure range as described with regard to the system 1400), boom width, target product coverage (e.g., in units of volume per unit area), machine speed (speed of the sprayer, tractor or the like), yaw rate (corresponding to the rotation of the sprayer and sprayer booms), nozzle index (an identifier indicating the location or number of a nozzle along a boom), nozzle spacing, or one or more flow coefficients of the nozzle assemblies 1308, control valves 1312 or the like.

Referring again to FIG. 13, the master node 1304 is in communication with the input interface 1302, one or more components of the sprayer 900 (or 1000) as well as the ECUs 1310 of each of the smart nozzles 1306. As shown, the master node 1304 includes an expected overall flow rate module 1318 in communication with the input interface 1302 and an adjustment module 1320 (also, in one example, associated with the master node 1304) or the like. As shown, the expected overall flow rate module 1318 receives a number of inputs from the input interface 1302 such as one or more sprayer characteristics including static characteristics (e.g., boom width, target pressure as a set point pressure, nozzle spacing or the like) and dynamic characteristics that optionally change over time (e.g., machine speed, yaw rate, target product coverage or the like). The expected overall flow rate module 1318 uses the values for the inputs to determine an expected overall flow rate based on these characteristics. The expected overall flow rate is optionally generated in an ongoing manner, for instance as one or more of the input values deviates from a previous value or according to a specified frequency of generation.

As further shown in FIG. 13, the master node 1304 includes an adjustment module 1320 in communication with the expected overall flow rate module 1318 and a flow meter 1322, such as the flow meter provided along a header (e.g., a manifold) of the sprayer, at a pump or control valve output near the agricultural product reservoir or the like. The flow meter 1322 measures the actual overall flow rate of agricultural product delivered through the sprayer, for instance, to each of the nozzle assemblies 1308. The overall actual flow rate is compared with the expected overall flow rate (generated at the module 1318) at the adjustment module 1320 to accordingly determine an error correction. The error correction is determined, for instance, by way of a comparison, difference function or the like. The error correction is optionally conditioned (e.g., integrated and passed through a gain module) to provide an error gain or other numerical multiplier or other product for use with the ECUs 1310 of each of the smart nozzles 1306. As described herein the ECUs 1310 generate target smart nozzle flow rates for the associated smart nozzles. The error correction is used by the ECUs to modify the generated target smart nozzle flow rates (including associated duty cycles) and correspondingly alter the performance of the nozzle assemblies 1308 to minimize the difference determined with the adjustment module 1320 and bias the summed target smart nozzle flow rates (determined by the ECUs 1310) toward the expected overall flow rate (determined by the master node 1304)

Referring again to FIG. 13, the master node 1304 further includes a feedback control module 1330 configured to control the system pressure of the agricultural product in the sprayer 900 (or 1000), for instance to maintain a specified droplet size in the sprayed agricultural product. The feedback module 1330 is in communication with an agricultural product output system 1326 including, for instance, a flow valve, pump or the like provided with the sprayer to control the pressure of the agricultural product (e.g., one or more of a carrier fluid, additive or combination of the carrier fluid and an additive such as the injection product) and delivery to the smart nozzles 1306. The feedback control module 1330 communicates with the agricultural product output system 1326, for instance, with an agricultural output system interface 1328 interposed between the master node 1304 and the output system 1326. The agricultural output system interface 1328 includes one or more of a wired connection, wireless connection, CAN bus interface or the like.

The feedback control module 1330 is, in one example, a PID controller (proportional-integral-derivative) that controls the agricultural product output system 1326 to maintain a system pressure, for instance, an overall system pressure of the agricultural product in the sprayer at a desired set point pressure or within a pressure range (e.g., target pressures). For instance, as shown in FIG. 13, the input interface 1302, in one example, includes a target pressure input communicated to the feedback control module 1330. In combination with the pressure sensor 1324 (e.g., corresponding to the pressure transducers 926, 1021) the feedback control module 1330 uses the sensed pressure from the pressure sensor 1324 in comparison with the set point pressure to to control the agricultural product outflow system 1326. The outflow system 1326 accordingly controls (including raising, lowering or maintaining) the pressure of the system toward the specified set point (e.g., the target pressure).

As will be described herein, in another example, the nozzle flow rate control system 1300 uses another example of a target pressure, a range of pressures, to control the pressure of the agricultural product in the system in combination with a specified target duty cycle for one or more of the smart nozzles 1306. Such an example of this system is provided and shown in FIG. 14. Optionally, the system 1400 of FIG. 14 is reconfigurable (e.g., by user input, such as by toggling a mode button) between the system 1300 using a set point target pressure and system 1400 using a range of pressures as the target pressure and a specified target duty cycle. In one example, operation of the system 1400 with a system pressure within the target range of pressures and with corresponding target smart nozzle flow rates is empirically determined to provide a corresponding duty cycle of the smart nozzle control valves 1312 proximate the specified target duty cycle.

As further shown in FIG. 13 and as previously described, each of the smart nozzles 1306 includes an electronic control unit (ECU) 1310 associated with one or more control valves 1312 and one or more nozzle assemblies 1308 each having a a nozzle body. Smart nozzles, such as the smart nozzles 1306 schematically shown in the Figure, include the smart nozzles previously described and shown in FIGS. 9A-12. The electronic control unit 1310 of the nozzle flow rate control system 1300 operates in parallel to the master node 1304. For instance, as shown the ECU 1310 includes a target smart nozzle flow rate module 1314 configured to generate a target smart nozzle flow rate in an ongoing fashion and, in this example, a duty cycle module 1316 configured to convert the target smart nozzle flow rate into a duty cycle for one or more of the control valves 1312 operable at a duty cycle (with a valve operator configured to reciprocate between off and on positions according to the duty cycle provided by the ECU 1310). In the example shown in FIG. 13, the target smart nozzle flow rate module 1314 receives a plurality of inputs from the input interface 1302 (optionally by way of the master node 1304) including the target product coverage per unit area, the machine speed (for instance, of the sprayer 900, 1000), the yaw rate of the sprayer, nozzle index (corresponding to a nozzle identifier or the like used in a lookup table or other database to determine the position of the nozzle for the ECU 1310) and nozzle spacing relative to other nozzles or to a fiducial or the like. The inputs are received at the target smart nozzle flow rate module 1314 and used to generate a target smart nozzle flow rate. In one example, the target smart nozzle flow rate generated by the module 1314 is updated in a continuous or ongoing fashion, for instance, as one or more of the specified target product coverage (for instance, units of volume per unit area), machine speed, yaw rate or the like change. The target smart nozzle flow rate module 1314 provides an updated target smart nozzle flow rate for use by the smart nozzle 1306 to operate the control valve 1312 and accordingly control the flow rate of the agricultural product through the nozzle assembly 1308.

As further shown in FIG. 13, in this example, the nozzle flow rate control system 1300 includes a duty cycle module 1316 configured for use with the control valve 1312 having a valve operator configured for skiable movement between closed and open positions, for instance, at a frequency of 1 hertz, 5 hertz, 10 hertz or more. The target smart nozzle flow rate generated by the module 1314 is received at the duty cycle module 1316 and, in one example, is used along with sensed (actual) pressure of the agricultural product along with one or more flow coefficients to determine a corresponding duty cycle. The duty cycle, when implemented at the control valve 1312, provides a corresponding flow rate through the nozzle assembly 1308 matching or substantially matching the target smart nozzle flow rate determined with the module 1314.

In the example shown in FIG. 1300, the duty cycle module 1316 includes a gain based feature, comparator or the like in communication with the adjustment module 1320. The error correction determined with the adjustment module 1320 of the master node 1304 is provided to each of the smart nozzles 1306. The error correction, for instance corresponding to a gain, multiplier or other correction factor, is used to adjust the duty cycle to an adjusted duty cycle that is then transmitted on to the control valve 1312. The control valve 1312 when operated according to the adjusted duty cycle delivers the agricultural product to the one or more nozzle bodies of the one or more nozzle assemblies 1308 at the target smart nozzle flow rate adjusted according to the error correction provided by the adjustment module 1320. The summed flow rates through one or more control valves 1312 and one or more nozzle assemblies 1308 across the smart nozzles 1306 thereby corresponds to or approaches the expected overall flow rate determined with the expected overall flow rate module 1318. Stated another way the difference determined with the adjustment module 1320 and the corresponding inputs to the adjustment module 1320 including the expected overall flow rate and the actual flow rate is used by the ECU 1310 of each of the smart nozzles 1306 to accordingly provide an adjusted duty cycle that delivers agricultural product at flow rates that approach or equal (when summed) the expected overall flow rate to thereby provide the specified target product coverage per unit area.

As previously described, the nozzle flow rate control system 1300 shown in FIG. 13 includes a feedback control module 1330 configured to maintain a target or set pressure point of the agricultural product within the sprayer such as the sprayer 900, 1000. In one example, by maintaining a set pressure or target pressure the target smart nozzle flow rate may vary while the target pressure is otherwise maintained with the agricultural product. In one example, the maintenance of the pressure facilitates the spraying of the agricultural product, for instance, from the nozzle assembly 1308 with a specified droplet size corresponding to the target pressure maintained in the system. Variations in the target smart nozzle flow rate (generated by the module 1314) and further conditioned by the duty cycle module 1316 as well as the adjustment module 1320 of the master node 1304 generate differing flow rates at the nozzle assemblies 1308 of the smart nozzles 1306. With the system 1300 the target pressure of the agricultural product within the system is maintained. For instance, the feedback control module 1330 maintains the target pressure or set point pressure despite changes in the smart nozzle flow rates collectively or individually (for instance, along a boom according to differing rotation speeds based on the yaw rate, machine speed or the like), and accordingly the droplet size of the spray of the agricultural product from the nozzle assemblies 1308 is maintained. Maintenance of the droplet size in some examples enhances the effectiveness of the application of an agricultural product, for instance by widely dispersing the product with small droplets or providing large droplets are that resistant to dispersion caused by wind.

By maintaining a target pressure in the sprayer, such as the sprayers 900, 1000, in some examples, the sprayer is operated at a limited range of speeds to accommodate the target product coverage in combination with the specified droplet size. Movement of the sprayer, for instance, at speeds slower or faster may result, in a discontinuous spray of the agricultural product from the nozzle assemblies 1308 of the smart nozzles 1306. That is to say, because the target pressure is maintained to provide a specified droplet size the target smart nozzle flow rates and the corresponding duty cycles may, in some examples, result in longer periods of closing of the control valves 1312 that accordingly generate one or more gaps in an otherwise continuous spray of the agricultural product from the nozzle assemblies 1308.

Referring now to FIG. 14, one example of a nozzle flow rate control system 1400 is shown that provides increased flexibility for the sprayer 900 (or 1000) that addresses potential discontinuity of the spray of agricultural product while also allowing for operation of the sprayer at higher flow rates (with higher pressures) and decreased flow rates (with lower pressures). In this example, the nozzle flow rate control system 1400 includes many components of the nozzle flow rate control system 1300 shown in FIG. 13. In some examples, the systems 1300 and 1400 are the same system and are toggled between a set pressure mode (system 1300) and a variable pressure mode (system 1400). In this example, the master node 1304 includes a pressure adjustment module 1402 configured to maintain the system pressure of the agricultural product and the sprayer within a specified target pressure range (e.g., target pressure for the purpose of description includes set point pressures as well as pressure ranges) provided, for instance at the input interface 1302.

As shown in FIG. 14, the nozzle flow rate control system 1400 includes similar components to the system 1300 previously shown and described in FIG. 13. For instance, the system 1400 includes an input interface 1302 configured to provide one or more inputs to the system including, but not limited to, boom width, specified product coverage (in units of volume per unit area), machine speed, yaw rate of the machine, nozzle index (corresponding in some examples to a location identifier relative to a total number of nozzles), nozzle spacing and one or more flow characteristics, for instance, flow coefficients of one or more of the nozzle assemblies 1308 and control valves 1312 of each of the smart nozzles 1306. In contrast to a set point pressure input (one example of a target pressure), the input interface 1302 shown in FIG. 14 includes a pressure range input (another example of a target pressure).

The system further 1400 includes a master node 1304 and a plurality of smart nozzles 1306. Each of the smart nozzles 1306 and the master node 1304 are coupled with the input interface 1302. As previously described, the ECU 1310 of each of the smart nozzles 1306 is configured to generate one or more target smart nozzle flow rates, for instance, with the target smart nozzle flow rate module 1314 and a duty cycle module 1316 where the control valve 1312 includes a valve operator configured to oscillate between off and on positions, for instance, at the duty cycle or adjusted duty cycle as described herein.

The master node 1304 includes an expected overall flow rate module 1318 and an adjustment module 1320. The adjustment module 1320 communicates with each of the expected overall flow rate module 1318 and the flow meter 1322 to determine a difference (error correction) between the expected overall flow rate generated by the module 1318 and the actual flow rate measured by the flow meter 1322. The adjustment module 1320 optionally conditions the difference (another refined example of the error correction) and submits it to the ECU 1310 of the smart nozzle 1306 (including a plurality of smart nozzles 1306) to accordingly condition the target smart nozzle flow rate, in this example, provided as a duty cycle to account for the difference between the expected overall flow rate and the actual overall flow rate. The adjusted duty cycle is transmitted to one or more control valves 1312 where the control valves accordingly operate valve operators or the like to provide a flow of the agricultural product through one or more nozzle assemblies 1308 at the target smart nozzle flow rate adjusted for the error correction. The total of the flow rates of each of the smart nozzles 1306 adjusted with the error correction matches (e.g., matches, approaches, trends toward or the like) the expected overall flow rate generated by the expected overall flow rate module 1318 because of the error correction used by each of the ECUs 1310 of the smart nozzles 1306.

In the example shown in FIG. 14, the nozzle flow rate control system 1400 further includes a pressure adjustment module 1402. As shown, the pressure adjustment module 1402 is in communication with the expected overall flow rate module 1318 and, with an expected flow rate generated by the module 1318, is configured to generate a target pressure for use with the feedback control module 1330.

As shown in FIG. 14, the master node 1304, in one example, includes a database, memory, index or other feature configured to provide an optimal duty cycle, for instance, for the one or more control valves 1312 provided with the smart nozzles 1306. The optimal duty cycle provided is different than the adjusted duty cycle or duty cycle generated by the duty cycle module 1316. Instead, the optimal duty cycle provided by the master node 1304 to the pressure adjustment module 1402 is a duty cycle configured to provide a continuous spray of the agricultural product while the sprayer 900 (or 1000) is operated at either of low and high speeds or low and high target flow rates of the agricultural products.

The pressure adjustment module 1402 uses the optimal duty cycle input along, the expected overall flow rate (generated from the expected overall flow rate module 1318) and one or more flow characteristics, for instance, flow coefficients of the nozzle assemblies 1308 to generate a target pressure. The target pressure is, in one example, generated in an ongoing fashion and sent to the feedback control module 1330. As shown in FIG. 14 the nozzle flow rate control system 1400 inputs a pressure range (in contrast to a set point pressure) to the feedback control module 1330. Where the target pressure (generated by the pressure module 1402) is outside of the pressure range it is adjusted to either of the upper or lower ends of the pressure range (whichever is closer to the target pressure) by the master node 1304. The feedback control module 1330 compares the adjusted target pressure (after passing through the comparison with the pressure range) with the system pressure (optionally measured with the pressure sensor 1324) and outputs instructions to the agricultural product system 1326, for instance, through the agricultural output system interface 1328 to accordingly raise or lower the system pressure of the sprayer 900 (or 1000) to accordingly change the actual system pressure to a value corresponding with the adjusted target pressure. The pressure adjustment module 1402 continues to generate target pressures to accordingly trigger operation of the feedback control module 1330 in corresponding operation of the agricultural product output system 1326 to raise or lower the system pressure and thereby adjust the flow rate of the agricultural product to the smart nozzles 1306 upwardly or downwardly.

As described herein, the pressure adjustment module 1402 is configured to generate target pressures, for instance, as a function of the optimal duty cycle, flow characteristics of the nozzle assemblies 1308 as well as the expected overall flow rate generated by the expected overall flow rate module 1318. The target pressure is used (within the specified pressure range) to increase and decrease the flow rate of the agricultural product in a variety of scenarios. For instance, in a low flow rate scenario, for instance, with the sprayer 900 (or 1000) moving at a relatively slow speed in the field, the expected overall flow rate 1318 decreases compared to flow rates used at moderate or higher speeds. The (lower) expected overall flow rate when sent to the pressure adjustment module 1402 is used by the module to generate a corresponding lower target pressure. The target pressure is compared with the pressure range, for instance, provided at the input interface 1302. If the target pressure is outside of the pressure range (e.g., below) it is elevated to the minimum value of the pressure range and passed to the feedback control module 1330. If the target pressure is within the pressure range it is passed to the feedback control module 1330. The feedback control module 1330 uses the target pressure and the sensed actual pressure to adjust the system pressure of the agricultural product toward the target pressure within the pressure range. The ECUs 1310 generate target smart nozzle flow rates (adjusted downward by the machine speed, lower target product coverage or the like) and corresponding adjusted duty cycles (determined in part by the system pressure at the target pressure and the error correction). Implementation of the target smart nozzle flow rate by using the adjusted duty cycle at the control valves 1312 provides a continuous spray of the agricultural product and accordingly prevents gaps in spray coverage. Stated another way, the lower target pressure allows the control valves 1312 to operate at higher duty cycles (optionally approaching or matching the optimal duty cycle) without over-application of the agricultural product. Conversely, where higher flow rates of the agricultural product are needed to achieve desired product coverage (for instance with the sprayer moving at high speeds) the target pressure is generated at a higher value by the pressure adjustment module and implemented with the feedback control module 1330 to provide added flow to the smart nozzles 1306.

Referring again to FIG. 14, in operation the sprayer 900 (or 1000) including the nozzle flow rate control system 1400 is optionally operated at a variety of speeds within a field including relatively low and high speeds while at the same time maintaining a continuous spray of the agricultural product through each of the smart nozzles 1306 including, for instance, their nozzle assemblies 1308. In one example, where the sprayer is operated at a relatively high speed and accordingly generates increased target smart nozzle flow rates from the ECUs 1310 (of the smart nozzles 1306) to satisfy a specified product coverage input (gallons per acre, liters per square meter or the like) the feedback control module 1330 of the master node 1304 in cooperation with its pressure adjustment module 1402 is configured to adjust the system pressure of the agricultural product toward a determined target pressure. The higher system pressure (based on the elevated target pressure determined with the module 1402) delivers more agricultural product to the smart nozzles to satisfy the increased target smart nozzle flow rates.

For instance, in one example, where the expected overall flow rate module 1318 generates a corresponding higher expected overall flow rate because of the increased machine speed, the higher expected overall flow rate is provided to the pressure adjustment module 1402. In combination with the optimal duty cycle, for instance, of the control valves 1312 used in the smart nozzles 1306, and the flow characteristics such as flow coefficients or the like the pressure adjustment module 1402 generates a corresponding target pressure configured to satisfy the higher expected overall flow rate. The feedback control module 1330 uses the target pressure in combination with the actual sensed pressure from the pressure sensor 1324 to elevate the system pressure to the target pressure. The system pressure is accordingly raised, for instance, toward the target pressure thereby facilitating an increased flow of the agricultural product through the sprayer 900 (or 1000), for instance, to each of the smart nozzles 1306 and nozzle assemblies 1308. At the ECU 1310, the increased speed as well as the specified product coverage (in units of volume per unit area) as well as other sprayer characteristics described herein are used by the target smart nozzle flow rate module 1314 to generate a corresponding target smart nozzle flow rate for each of the smart nozzles 1306 (optionally varying according to one or more of position, yaw rate, boom location of the nozzles or the like) and passed along to the duty cycle module 1316. The duty cycle module 1316 uses the sensed pressure of the system (in this example elevated to the target pressure) in combination with the target smart nozzle flow rate and the error correction from the adjustment module 1320 to generate an adjusted duty cycle. The adjusted duty cycle is implemented at the control valves 1312 and the control valves 1312 deliver agricultural product to the nozzles of the one or more nozzle assemblies 1308. The nozzle assemblies in turn generate a continuous stream of the agricultural product that achieves the high target smart nozzle flow rate (because of the increased speed of the sprayer) as a function of the increased target pressure (and corresponding elevated system pressure) of the agricultural product.

Conversely, in a low speed scenario, the nozzle flow rate control system 1400 generates an expected flow rate at the expected overall flow rate module 1318 of the master node 1304 based in part on the relatively lower speed of the sprayer 900 (or 1000). The corresponding expected overall flow rate is used by the pressure adjustment nodule 1402 in combination with the optimal duty cycle for the control valves 1312 and one or more nozzle characteristics to generate a target pressure, for instance, a lower target pressure relative to the previous example. The (lower) target pressure is passed to the feedback control module 1330. As previously described, the target pressure is adjusted to the bottom of the specified pressure range if outside of the range and then used by the feedback control module 1330 in combination with the sensed pressure to change the system pressure to a value corresponding to the target pressure (including the target pressure if it is adjusted into the pressure range). The target smart nozzle flow rate modules 1314 of each of the smart nozzle ECUs 1310 generate target smart nozzle flow rates, for instance, relatively low flow rates. The low flow rates are used by the duty cycle modules 1316 of the smart nozzles 1306 in combination with the depressed system pressure (controlled with the feedback control module 1330 to the target pressure) to generate a corresponding duty cycle (e.g., an adjusted duty cycle with error correction). The control valve 1312 implements the adjusted duty cycle and provides a relatively low flow rate of the agricultural product. The agricultural product is sprayed from the nozzle assemblies 1308 at the relatively low rate in a continuous manner (e.g., without gaps otherwise caused with duty cycles having a significant portion of the operation cycle off or closed). Stated another way, by lowering the system pressure as described herein, the control valves 1312 deliver a low flow rate of the agricultural product while operating at relatively higher duty cycles (e.g., approaching the optimal duty cycle) to maintain continuity of the spray. In a system using a consistent (static) pressure in one example the flow rate of the agricultural product to the smart nozzles, if operated at higher duty cycles to maintain spraying continuity, would exceed the target smart nozzle flow rates and accordingly over apply (and waste) the agricultural product. Alternatively, if the duty cycle is lowered (relative to the optimal duty cycle) to decrease over application spray continuity is negatively affected and gaps are provided in the spray.

The pressure ranges used with the system 1400 are in examples determined by the agricultural product applied with the sprayer. For instance, with agricultural products that rely on specified droplet sizes the pressure range is relatively small, for instance a range of 10 psi or less (such as 30 to 40 psi), to ensure the target pressures determined with the pressure adjustment module 1402 result in controlled system pressures that are elevated or depressed (within the range) to provide droplets of the specified size. Agricultural products having specified droplet sizes include, but are not limited to, herbicides, pesticides, liquids that are applied with large droplets to avoid dispersion caused by air currents or the like.

In other examples, agricultural products are applied that do not specify a droplet size or that are usable across a range of droplet sizes. In these examples, a larger target pressure range is input, for instance greater than 10 psi to allow for higher system pressures and corresponding operation of the sprayer at higher speeds, with larger specified product coverage (gallons per acre, liters per square meter or the like) or the like. The target pressures generated by the pressure adjustment module 1402 are passed along to the feedback control module with adjustment only conducted where the target pressures are outside of the larger specified range. Accordingly, the system pressure is raised and lowered within the larger specified range to the target pressure to accommodate higher and lower flow rates. The sprayer is thereby operable at higher speeds, with greater product coverage, or the like by elevating the system pressure to deliver increased agricultural product to the smart nozzles for use with corresponding (higher) target smart nozzle flow rates generated by the ECUs 1310. Each of the nozzle flow rate control systems 1300, 1400 described herein are described with regard to the schematic smart nozzles 1306. As shown, the smart nozzles 1306 include nozzle assemblies 1308. In examples, the nozzle assemblies 1308 include one or more nozzle assemblies, for instance, one or more nozzle assemblies coupled with a single control valve 1312 or control valves 1312 smaller in number relative to the number of nozzle assemblies 1308. In other examples, the nozzle assemblies 1308 are coupled with individual control valves 1312 and each smart nozzle 1306 correspondingly includes a control valve 1312 and a dedicated nozzle assembly 1308 affiliated with that control valve 1312. In still other examples, the nozzle assemblies 1308 described herein and associated with each of the control valves 1312 of the smart nozzles 1306 are, in one example, composite or stacked nozzle assemblies. For instance, in one example, the nozzle assembly 1308 includes, in one example, a bimodal control valve having both off and on bimodal positions to accordingly provide a base flow of the agricultural product as a spray from that nozzle assembly. Additionally, the nozzle assembly 1308 when in a stacked configuration includes a variable rate control valve having an off position, an on operating position and a plurality of intermediate operating positions therebetween controlled by the duty cycle input from the ECU 1310 of the respective smart nozzle 1306. In a high flow example, previously described with regard to FIG. 14, the bimodal control valve (1212 in FIG. 12) is in the on bimodal operating position while the variable rate control valve (1210) varies the flow rate through the nozzle assembly 1308. That is to say, the variable rate control valve 1210 along with its corresponding nozzle provides a variable spray of the agricultural produce in addition to a base flow rate of the agricultural product provided through the bimodal control valve 1212 and its associated nozzle. Systems 1300, 1400 described herein are both configured for operation in low and high flow modes (as well as static and variable pressure modes). In one example, where the systems 1300, 1400 include stacked nozzle assemblies the bimodal control valve 1212 is, in one example, operated (in the on bimodal operating position) in a high flow mode. Conversely, in a low flow mode, the bimodal control valve 1212 is in a closed bimodal position and the variable rate control valve 1210 is operated by itself to provide the entirety of the flow rate and spray pattern of the agricultural product from the respective nozzle assembly 1308 (corresponding to the nozzle assembly 1204 in FIG. 12).

FIG. 14 (described herein) illustrates a general overview of a nozzle control system configured to operate in a variable pressure mode of operation according to an example of the present subject matter. In contrast to the operating mode illustrated in FIG. 13, the master node 1304 can receive or be programmed with a target duty cycle and the pressure set point can be modified to maintain that target duty cycle. In the illustrated example of FIG. 14, a nozzle model circuit of the master node 1304 can receive a number of inputs including the target duty cycle and the target flow rate, and can provide a pressure set point. In certain examples, the user can enter a pressure range that can be used for indication of when the system is unable to meet the desired performance with regards to duty cycle of a nozzle. In some examples, the pressure range parameters can be used to control additional nozzle bodies in a stacked nozzle (e.g., shown in FIG. 12). For example, as the pressure reaches an upper pressure limit, a second nozzle body can be turned "on" and the nozzle body having the nozzle control valve can then be controlled to supplement the coverage provided by the second nozzle body. Similarly, as the pressure reaches a lower pressure limit, a second nozzle body can be turned "off" and the nozzle body having the nozzle control valve can then be controlled to provide a fraction of the material previously provided by the second nozzle body. It is understood that the illustrated control technique is only one of several control strategies that can be employed to provide variable pressure control as discussed above and the other control strategies that vary the pressure set point based on a target duty cycle are possible without departing from the scope of the present subject matter. For example, feed forward gain, look ahead strategies, and predictive modeling of the system can also be used to increase the dynamic behavior and responsiveness of the pressure control system.

NOTES AND EXAMPLES

Example 1 can include subject matter such as a system for controlling nozzle flow rate comprising: an input interface configured to receive one or more sprayer characteristics of an agricultural sprayer, the one or more sprayer characteristics including one or more of sprayer boom width, target product coverage per unit area, sprayer speed, sprayer yaw rate or nozzle characteristics; a master node in communication with the input interface, the master node includes: an expected overall flow rate module configured to generate an expected overall flow rate of an agricultural product based on the one or more sprayer characteristics, and an adjustment module configured to generate an error correction based on a difference between the expected overall flow rate and an actual overall flow rate of the agricultural product; and a plurality of smart nozzles in communication with the master node, each of the smart nozzles includes an electronic control unit (ECU) in communication with one or more control valves and one or more nozzle assemblies, each of the smart nozzles includes: a target smart nozzle flow rate module configured to generate a target smart nozzle flow rate of the agricultural product based on the one or more sprayer characteristics, and a duty cycle module in communication with the adjustment module, the duty cycle module configured to generate an adjusted duty cycle for the one or more control valves based on the target smart nozzle flow rate and the error correction.

Example 2 can include, or can optionally be combined with the subject matter of Example 1, to optionally include wherein the master node is in communication with a flow meter, the flow meter configured to measure the actual overall flow rate.

Example 3 can include, or can optionally be combined with the subject matter of one or any combination of Examples 1 or 2 to optionally include wherein the target smart nozzle flow rate module is configured to generate ongoing values of the target smart nozzle flow rate based on changes in the one or more sprayer characteristics.

Example 4 can include, or can optionally be combined with the subject matter of one or any combination of Examples 1-3 to optionally include wherein the expected overall flow rate module is configured to generate ongoing values of the expected overall flow rate based on changes in the one or more sprayer characteristics.

Example 5 can include, or can optionally be combined with the subject matter of one or any combination of Examples 1-4 to optionally include wherein the adjustment module is configured to generate ongoing values of the error correction based on ongoing values of the expected overall flow rate and the actual overall flow rate measured with a flow meter.

Example 6 can include, or can optionally be combined with the subject matter of Examples 1-5 to optionally include wherein the one or more sprayer characteristics includes a target pressure, and the master node includes: an agricultural product output interface configured for coupling with an agricultural output system, and a feedback control module in communication with a pressure sensor, the pressure sensor configured to measure the actual pressure of an agricultural product, the feedback control module configured to control the agricultural product output interface according to the difference between the actual pressure and a target pressure.

Example 7 can include, or can optionally be combined with the subject matter of Examples 1-6 to optionally include wherein the target pressure is a set point pressure value corresponding to a specified droplet size of the agricultural product for the one or more nozzle assemblies, and the feedback control module is configured to maintain the actual pressure of the agricultural product at the set point pressure value and generate the specified droplet size independent of changes to the expected overall flow rate, actual overall flow rate, the target smart nozzle flow rate and the adjusted duty cycle.

Example 8 can include, or can optionally be combined with the subject matter of Examples 1-7 to optionally include wherein the target pressure includes a target pressure range, and the master node includes a pressure adjustment module in communication with the expected overall flow rate module, the pressure adjustment module is configured to generate an updated target pressure based on: nozzle characteristics of the one or more nozzle assemblies, a specified duty cycle for the control valves of the one or more nozzle assemblies, and the expected overall flow rate generated by the expected overall flow rate module.

Example 9 can include, or can optionally be combined with the subject matter of Examples 1-8 to optionally include wherein the specified duty cycle corresponds to an oscillating duty cycle of the control valve between open and closed positions, the nozzle body configured to generate a continuous spray of the agricultural product based on the specified duty cycle.

Example 10 can include, or can optionally be combined with the subject matter of Examples 1-9 to optionally include wherein the feedback control module is in communication with the pressure adjustment module, and the feedback control module is configured to control the agricultural product output interface if the updated target pressure is outside of the target pressure range.

Example 11 can include, or can optionally be combined with the subject matter of Examples 1-10 to optionally include wherein the one or more control valves each include an oscillating valve operator configured to oscillate between open and closed positions based on the adjusted duty cycle.

Example 12 can include, or can optionally be combined with the subject matter of Examples 1-11 to optionally include wherein the one or more nozzle assemblies include a plurality of nozzle assemblies and the adjusted duty cycle includes distinct adjusted duty cycles for each control valve of the one or more control valves, and the distinct adjusted duty cycles vary relative to each other according to one or more of the sprayer characteristics including the boom width, the sprayer yaw rate and nozzle body location of each of the plurality of nozzle assemblies along a sprayer boom.

Example 13 can include, or can optionally be combined with the subject matter of Examples 1-12 to optionally include an agricultural product reservoir; at least one sprayer boom in communication with the agricultural product reservoir; a flow meter configured to measure the actual overall flow rate of the agricultural product from the agricultural product reservoir to the at least one sprayer boom; and a pressure sensor configured to measure an actual pressure of the agricultural product delivered to the at least one sprayer boom.

Example 14 can include, or can optionally be combined with the subject matter of Examples 1-13 to optionally include a system for controlling nozzle flow rate in an agricultural sprayer comprising: a flow meter configured to measure an actual overall flow rate of the agricultural sprayer; a pressure sensor configured to measure an actual pressure of an agricultural product; a master node in communication with the flow meter and the pressure sensor, the master node configured to receive one or more sprayer characteristics of the agricultural sprayer, the master node includes: an expected overall flow rate module configured to generate an expected overall flow rate based on the one or more sprayer characteristics, an adjustment module configured to generate an error correction based on a difference between the expected overall flow rate and the actual overall flow rate, and a feedback control module configured to control an agricultural product output interface according to the difference between the actual pressure and a target pressure; and a plurality of smart nozzles in communication with the master node, each of the smart nozzles includes an electronic control unit (ECU) in communication with one or more control valves and one or more nozzle assemblies, the ECU of each smart nozzle includes: a target smart nozzle flow rate module configured to generate a target smart nozzle flow rate based on the one or more sprayer characteristics, and a duty cycle module in communication with the adjustment module, the duty cycle module configured to generate an adjusted duty cycle for the one or more control valves based on the target smart nozzle flow rate and the error correction.

Example 15 can include, or can optionally be combined with the subject matter of Examples 1-14 to optionally include wherein the master node includes an input interface configured to receive one or more sprayer characteristics of the agricultural sprayer, the one or more sprayer characteristics including one or more of sprayer boom width, target product coverage per unit area, sprayer speed, sprayer yaw rate or nozzle characteristics;

Example 16 can include, or can optionally be combined with the subject matter of Examples 1-15 to optionally include wherein the target smart nozzle flow rate module is configured to generate ongoing values of the target smart nozzle flow rate based on changes in the one or more sprayer characteristics.

Example 17 can include, or can optionally be combined with the subject matter of Examples 1-16 to optionally include wherein the expected overall flow rate module is configured to generate ongoing values of the expected overall flow rate based on changes in the one or more sprayer characteristics.

Example 18 can include, or can optionally be combined with the subject matter of Examples 1-17 to optionally include wherein the adjustment module is configured to generate ongoing values of the error correction based on ongoing values of the expected overall flow rate and the actual overall flow rate.

Example 19 can include, or can optionally be combined with the subject matter of Examples 1-18 to optionally include wherein the target pressure is a set point pressure value corresponding to a specified droplet size of the agricultural product dispensed from a nozzle body of the one or more nozzle assemblies, and the feedback control module is configured to maintain the actual pressure of the agricultural product at the set point pressure value and generate the specified droplet size independent of changes to the expected overall flow rate, actual overall flow rate, the target smart nozzle flow rate and the adjusted duty cycle.

Example 20 can include, or can optionally be combined with the subject matter of Examples 1-19 to optionally include wherein the target pressure includes a target pressure range, and the master node includes a pressure adjustment module in communication with the expected overall flow rate module, the pressure adjustment module is configured to generate an updated target pressure based on: nozzle characteristics of the one or more nozzle assemblies, a specified duty cycle for the one or more control valves, and the expected overall flow rate generated by the expected overall flow rate module.

Example 21 can include, or can optionally be combined with the subject matter of Examples 1-20 to optionally include wherein the specified duty cycle corresponds to an oscillating duty cycle of the control valves between open and closed positions, the nozzle body configured to generate a continuous spray of the agricultural product based on the specified duty cycle.

Example 22 can include, or can optionally be combined with the subject matter of Examples 1-21 to optionally include wherein the feedback control module is in communication with the pressure adjustment module, and the feedback control module is configured to control the agricultural product output interface if the updated target pressure is outside of the target pressure range.

Example 23 can include, or can optionally be combined with the subject matter of Examples 1-22 to optionally include wherein the one or more nozzle assemblies each include a stacked nozzle assembly having at least one of the control valves of the one or more control valves, the stacked nozzle assembly includes: a variable rate control valve having an off position, an on operating position and a plurality of intermediate operating positions therebetween, a bimodal control valve having an off bimodal position and an on bimodal operating position, and wherein the agricultural product is delivered through one or both of the variable rate and bimodal control valves based on the target smart nozzle flow rate.

Example 24 can include, or can optionally be combined with the subject matter of Examples 1-23 to optionally include wherein the one or more nozzle assemblies each include a first nozzle body coupled with the variable rate control valve, and a second nozzle body coupled with the bimodal control valve.

Example 25 can include, or can optionally be combined with the subject matter of Examples 1-24 to optionally include wherein the one or more nozzle assemblies include a plurality of nozzle assemblies and the adjusted duty cycle includes distinct adjusted duty cycles for each control valve of the one or more control valves, and the distinct adjusted duty cycles vary relative to each other according to one or more of the sprayer characteristics including boom width, sprayer yaw rate and nozzle body location of each of the plurality of nozzle assemblies along a sprayer boom.

Example 26 can include, or can optionally be combined with the subject matter of Examples 1-25 to optionally include wherein the agricultural product output interface is coupled with one or more of a product pump or a header control valve.

Example 27 can include, or can optionally be combined with the subject matter of Examples 1-26 to optionally include a method for controlling nozzle flow rate in an agricultural sprayer comprising: inputting a target product coverage per unit area for an agricultural product to a master node and a plurality of smart nozzles, each of the smart nozzles includes an electronic control unit (ECU) and one or more nozzle assemblies; generating an error correction for the plurality of smart nozzles including: determining an expected overall flow rate of the agricultural product based on the target product coverage per unit area and one or more sprayer characteristics, measuring an actual overall flow rate of the agricultural product, and determining the error correction based on the difference between the expected overall flow rate and the actual overall flow rate; and determining an adjusted duty cycle for one or more control valves each coupled with one or more nozzle assemblies included with each smart nozzle, determining the adjusted duty cycle includes: generating a target smart nozzle flow rate of the agricultural product based on the target product coverage per unit area and the one or more sprayer characteristics, and determining an adjusted duty cycle based on the target smart nozzle flow rate and the error correction.

Example 28 can include, or can optionally be combined with the subject matter of Examples 1-27 to optionally include dispensing agricultural product from the nozzle assemblies including: operating the one or more control valves according to the adjusted duty cycle received by the associated smart nozzle of the plurality of smart nozzles, and delivering the agricultural product through nozzle bodies of the one or more nozzle assemblies at the target smart nozzle flow rate adjusted according to the error correction.

Example 29 can include, or can optionally be combined with the subject matter of Examples 1-28 to optionally include wherein generating the target smart nozzle flow rate is based on the target product coverage per unity area and the one or more sprayer characteristics including one or more of sprayer boom width, sprayer speed, sprayer yaw rate or nozzle characteristics.

Example 30 can include, or can optionally be combined with the subject matter of Examples 1-29 to optionally include controlling an actual pressure of the agricultural product, controlling includes: sensing the actual pressure of the agricultural product, determining a difference between the actual pressure and a target pressure, and adjusting the actual pressure of the agricultural product according to the determined difference.

Example 31 can include, or can optionally be combined with the subject matter of Examples 1-30 to optionally include wherein the target pressure includes a set point pressure value corresponding to a specified droplet size of the agricultural product for nozzle bodies of the one or more nozzle assemblies, comprising: generating droplets from the nozzle bodies of the one or more nozzle assemblies having the specified droplet size according to the target pressure, the determined difference, and independent of the adjusted duty cycle and changes in the adjusted duty cycle.

Example 32 can include, or can optionally be combined with the subject matter of Examples 1-31 to optionally include wherein the target pressure includes a target pressure range, and controlling the actual pressure of the agricultural product includes updating a target pressure, updating the target pressure includes: determining the updated target pressure based on one or more nozzle characteristics of the one or more nozzle assemblies, the expected overall flow rate, and a specified duty cycle for the one or more control valves independent from the adjusted duty cycle, comparing the updated target pressure with the target pressure range, and adjusting the actual pressure of the agricultural product if the updated target pressure is outside of the target pressure range.

Example 33 can include, or can optionally be combined with the subject matter of Examples 1-32 to optionally include comprising dispensing agricultural product from the nozzle assemblies including: operating the one or more control valves according to the adjusted duty cycle received by the associated smart nozzle of the plurality of smart nozzles, maintaining the actual pressure within the target pressure range based on updating of the target pressure, and continuously spraying the agricultural product through the nozzle bodies of the one or more nozzle assemblies based on maintenance of the actual pressure within the target pressure range, the agricultural product continuously sprayed at the target smart nozzle flow rate adjusted for the error correction.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system for controlling nozzle flow rate comprising:
an input interface configured to receive one or more sprayer characteristics of an agricultural sprayer, the one or more sprayer characteristics including one or more of sprayer boom width, target product coverage per unit area, sprayer speed, sprayer yaw rate or nozzle characteristics;
a master node in communication with the input interface, the master node includes:
an expected overall flow rate module configured to generate an expected overall flow rate of an agricultural product based on the one or more sprayer characteristics, and
an adjustment module configured to generate an error correction based on a difference between the expected overall flow rate and an actual overall flow rate of the agricultural product; and
a plurality of smart nozzles in communication with the master node, each of the smart nozzles includes an electronic control unit (ECU) in communication with one or more control valves and one or more nozzle assemblies, each of the smart nozzles includes:
a target smart nozzle flow rate module configured to generate a target smart nozzle flow rate of the agricultural product based on the one or more sprayer characteristics, and
a duty cycle module in communication with the adjustment module, the duty cycle module configured to generate an adjusted duty cycle for the one or more control valves based on the target smart nozzle flow rate and the error correction.

2. The system of claim 1, wherein the master node is in communication with a flow meter, the flow meter configured to measure the actual overall flow rate.

3. The system of claim 1, wherein the target smart nozzle flow rate module is configured to generate ongoing values of the target smart nozzle flow rate based on changes in the one or more sprayer characteristics.

4. The system of claim 1, wherein the expected overall flow rate module is configured to generate ongoing values of the expected overall flow rate based on changes in the one or more sprayer characteristics.

5. The system of claim 4, wherein the adjustment module is configured to generate ongoing values of the error correction based on ongoing values of the expected overall flow rate and the actual overall flow rate measured with a flow meter.

6. The system of claim 1, wherein the one or more sprayer characteristics includes a target pressure, and the master node includes:
an agricultural product output interface configured for coupling with an agricultural output system, and
a feedback control module in communication with a pressure sensor, the pressure sensor configured to measure an actual pressure of an agricultural product, the feedback control module configured to control the agricultural product output interface according to a difference between the actual pressure and a target pressure.

7. The system of claim 6, wherein the target pressure is a set point pressure value corresponding to a specified droplet size of the agricultural product for the one or more nozzle assemblies, and the feedback control module is configured to maintain the actual pressure of the agricultural product at the set point pressure value and generate the specified droplet size independent of changes to the expected overall flow rate, actual overall flow rate, the target smart nozzle flow rate and the adjusted duty cycle.

8. The system of claim 6, wherein the target pressure includes a target pressure range, and the master node includes a pressure adjustment module in communication with the expected overall flow rate module, the pressure adjustment module is configured to generate an updated target pressure based on:

nozzle characteristics of the one or more nozzle assemblies, a specified duty cycle for the control valves of the one or more nozzle assemblies, and the expected overall flow rate generated by the expected overall flow rate module.

9. The system of claim 8, wherein the specified duty cycle corresponds to an oscillating duty cycle of the control valve between open and closed positions, the nozzle body configured to generate a continuous spray of the agricultural product based on the specified duty cycle.

10. The system of claim 8, wherein the feedback control module is in communication with the pressure adjustment module, and the feedback control module is configured to control the agricultural product output interface if the updated target pressure is outside of the target pressure range.

11. The system of claim 1, wherein the one or more control valves each include an oscillating valve operator configured to oscillate between open and closed positions based on the adjusted duty cycle.

12. The system of claim 1, wherein the one or more nozzle assemblies include a plurality of nozzle assemblies and the adjusted duty cycle includes distinct adjusted duty cycles for each control valve of the one or more control valves, and the distinct adjusted duty cycles vary relative to each other according to one or more of the sprayer characteristics including the boom width, the sprayer yaw rate and nozzle body location of each of the plurality of nozzle assemblies along a sprayer boom.

13. The system of claim 1 comprising:

an agricultural product reservoir;

at least one sprayer boom in communication with the agricultural product reservoir;

a flow meter configured to measure the actual overall flow rate of the agricultural product from the agricultural product reservoir to the at least one sprayer boom; and a pressure sensor configured to measure an actual pressure of the agricultural product delivered to the at least one sprayer boom.

14. A system for controlling nozzle flow rate in an agricultural sprayer comprising:
a flow meter configured to measure an actual overall flow rate of the agricultural sprayer;
a pressure sensor configured to measure an actual pressure of an agricultural product;
a master node in communication with the flow meter and the pressure sensor, the master node configured to receive one or more sprayer characteristics of the agricultural sprayer, the master node includes:
an expected overall flow rate module configured to generate an expected overall flow rate based on the one or more sprayer characteristics,
an adjustment module configured to generate an error correction based on a difference between the expected overall flow rate and the actual overall flow rate, and
a feedback control module configured to control an agricultural product output interface according to the difference between the actual pressure and a target pressure; and
a plurality of smart nozzles in communication with the master node, each of the smart nozzles includes an electronic control unit (ECU) in communication with one or more control valves and one or more nozzle assemblies, the ECU of each smart nozzle includes:
a target smart nozzle flow rate module configured to generate a target smart nozzle flow rate based on the one or more sprayer characteristics, and
a duty cycle module in communication with the adjustment module, the duty cycle module configured to generate an adjusted duty cycle for the one or more control valves based on the target smart nozzle flow rate and the error correction.

15. The system of claim 14 comprising wherein the master node includes an input interface configured to receive one or more sprayer characteristics of the agricultural sprayer, the one or more sprayer characteristics including one or more of sprayer boom width, target product coverage per unit area, sprayer speed, sprayer yaw rate or nozzle characteristics.

16. The system of claim 14, wherein the target smart nozzle flow rate module is configured to generate ongoing values of the target smart nozzle flow rate based on changes in the one or more sprayer characteristics.

17. The system of claim 14, wherein the expected overall flow rate module is configured to generate ongoing values of the expected overall flow rate based on changes in the one or more sprayer characteristics.

18. The system of claim 17, wherein the adjustment module is configured to generate ongoing values of the error correction based on ongoing values of the expected overall flow rate and the actual overall flow rate.

19. The system of claim 14, wherein the target pressure is a set point pressure value corresponding to a specified droplet size of the agricultural product dispensed from a nozzle body of the one or more nozzle assemblies, and
the feedback control module is configured to maintain the actual pressure of the agricultural product at the set point pressure value and generate the specified droplet size independent of changes to the expected overall flow rate, actual overall flow rate, the target smart nozzle flow rate and the adjusted duty cycle.

20. The system of claim 14, wherein the target pressure includes a target pressure range, and the master node includes a pressure adjustment module in communication with the expected overall flow rate module, the pressure adjustment module is configured to generate an updated target pressure based on:
nozzle characteristics of the one or more nozzle assemblies,
a specified duty cycle for the one or more control valves, and
the expected overall flow rate generated by the expected overall flow rate module.

21. The system of claim 20, wherein the specified duty cycle corresponds to an oscillating duty cycle of the control valves between open and closed positions, the nozzle body configured to generate a continuous spray of the agricultural product based on the specified duty cycle.

22. The system of claim 20, wherein the feedback control module is in communication with the pressure adjustment, module, and the feedback control module is configured to control the agricultural product output interface if the updated target pressure is outside of the target pressure range.

23. The system of claim 14, wherein the one or more nozzle assemblies each include a stacked nozzle assembly having at least one of the control valves of the one or more control valves, the stacked nozzle assembly includes:
a variable rate control valve having an off position, an on operating position and a plurality of intermediate operating positions therebetween,
a bimodal control valve having an off bimodal position and an on bimodal operating position, and
wherein the agricultural product is delivered through one or both of the variable rate and bimodal control valves based on the target smart nozzle flow rate.

24. The system of claim 23, wherein the one or more nozzle assemblies each include a first nozzle body coupled with the variable rate control valve, and a second nozzle body coupled with the bimodal control valve.

25. The system of claim 14, wherein the one or more nozzle assemblies include a plurality of nozzle assemblies and the adjusted duty cycle includes distinct adjusted duty cycles for each control valve of the one or more control valves, and
the distinct adjusted duty cycles vary relative to each other according to one or more of the sprayer characteristics including boom width, sprayer yaw rate and nozzle body location of each of the plurality of nozzle assemblies along a sprayer boom.

26. The system of claim 14, wherein the agricultural product output interface is coupled with one or more of a product pump or a header control valve.

27. A method for controlling nozzle flow rate in an agricultural sprayer comprising:
inputting a target product coverage per unit area for an agricultural product to a master node and a plurality of smart nozzles, each of the smart nozzles includes an electronic control unit (ECU) and one or more nozzle assemblies;
generating an error correction for the plurality of smart nozzles including:
determining an expected overall flow rate of the agricultural product based on the target product coverage per unit area and one or more sprayer characteristics, measuring an actual overall flow rate of the agricultural product, and determining the error correction based on a difference between the expected overall flow rate and the actual overall flow rate; and determining an adjusted duty cycle for one or more control valves each coupled with one or more nozzle assemblies included with each smart nozzle, determining the adjusted duty cycle includes:

generating a target smart nozzle flow rate of the agricultural product based on the target product coverage per unit area and the one or more sprayer characteristics, and determining an adjusted duty cycle based on the target smart nozzle the error correction.

28. The method of claim 27 comprising dispensing agricultural product from the nozzle assemblies including:

operating the one or control valves according to the adjusted duty cycle received by the associated smart nozzle of the plurality of smart nozzles, and delivering the agricultural product through nozzle bodies of the one or more nozzle assemblies at the target smart nozzle flow rate adjusted according to the error correction.

29. The method of claim 27, wherein generating the target smart nozzle flow rate is based on the target product coverage per unity area and the one or more sprayer characteristics including one or more of sprayer boom width, sprayer speed, sprayer yaw rate or nozzle characteristics.

30. The method of claim 27 comprising controlling an actual pressure of the agricultural product, controlling includes:

sensing the actual pressure of the agricultural product, determining a difference between the actual pressure and a target pressure, and adjusting the actual pressure of the agricultural product according to the determined difference.

31. The method of claim 30, wherein the target pressure includes a set point pressure value corresponding to a specified droplet size of the agricultural product for nozzle bodies of the one or more nozzle assemblies, comprising:

generating droplets from the nozzle bodies of the one or more nozzle assemblies having the specified droplet size according to the target pressure, the determined difference, and independent of the adjusted duty cycle and changes in the adjusted duty cycle.

32. The method of claim 30, wherein the target pressure includes a target pressure range, and controlling the actual pressure of the agricultural product includes updating a target pressure, updating the target pressure includes:

determining the updated target pressure based on one or more nozzle characteristics of the one or more nozzle assemblies, the expected overall flow rate, and a specified duty cycle for the one or more control valves independent from the adjusted duty cycle, comparing the updated target pressure with the target pressure range, and adjusting the actual pressure of the agricultural product if the updated target pressure is outside of the target pressure range.

33. The method of claim 32 comprising dispensing agricultural product from the nozzle assemblies including:

operating the one or more control valves according to the adjusted duty cycle received by the associated smart nozzle of the plurality of smart nozzles, maintaining the actual pressure within the target pressure range based on updating of the target pressure, and continuously spraying the agricultural product through the nozzle bodies of the one or more nozzle assemblies based on maintenance of the actual pressure within the target pressure range, the agricultural product continuously sprayed at the target smart nozzle flow rate adjusted for the error correction.

* * * * *